US010002392B2

(12) United States Patent
Sweeney et al.

(10) Patent No.: US 10,002,392 B2
(45) Date of Patent: Jun. 19, 2018

(54) DATABASE SYSTEM AND OBJECT MANIPULATION REPRESENTING PLACEMENT LAYERS AND PARTS

(71) Applicant: OnRisk, Inc., Princeton, NJ (US)

(72) Inventors: Francis Joseph Sweeney, Pennington, NJ (US); John Arthur Daves Kelley, Palo Alto, CA (US); William Harvey, Palo Alto, CA (US)

(73) Assignee: OnRisk, Inc., Princeton, NJ (US)

( * ) Notice: Subject to any disclaimer, the term of this patent is extended or adjusted under 35 U.S.C. 154(b) by 483 days.

(21) Appl. No.: 14/689,674

(22) Filed: Apr. 17, 2015

(65) Prior Publication Data

US 2016/0307274 A1    Oct. 20, 2016

(51) Int. Cl.
| | | |
|---|---|---|
| *G06Q 40/00* | (2012.01) | |
| *G06Q 40/08* | (2012.01) | |
| *G06F 3/0484* | (2013.01) | |
| *G06F 17/21* | (2006.01) | |
| *G06F 17/24* | (2006.01) | |

(52) U.S. Cl.
CPC ......... *G06Q 40/08* (2013.01); *G06F 3/04842* (2013.01); *G06F 3/04845* (2013.01); *G06F 17/212* (2013.01); *G06F 17/245* (2013.01)

(58) Field of Classification Search
None
See application file for complete search history.

(56) References Cited

U.S. PATENT DOCUMENTS

| | | | | |
|---|---|---|---|---|
| 5,956,691 | A  * | 9/1999 | Powers | G06Q 40/08 |
| | | | | 705/4 |
| 7,672,879 | B1 * | 3/2010 | Kumar | G06F 17/30867 |
| | | | | 705/30 |
| 7,698,158 | B1 | 4/2010 | Flagg | |
| 8,666,788 | B1 * | 3/2014 | Syed | G06Q 40/08 |
| | | | | 705/35 |

(Continued)

FOREIGN PATENT DOCUMENTS

WO    2009105475 A1    8/2009

OTHER PUBLICATIONS

Khanna, Ajay and Taylot, Mark, "Oracle BPM for Insurance", Sep. 2012, entire document (Year: 2012).*

(Continued)

*Primary Examiner* — Ryan D Donlon
*Assistant Examiner* — Christopher Bridges
(74) *Attorney, Agent, or Firm* — Haynes Beffel & Wolfeld LLP; Ernest J. Beffel, Jr.

(57) ABSTRACT

The technology disclosed relates to manipulating and visualizing database objects that represent layers and parts of layers in an insurance or other risk transfer program. In particular, a special purpose database system replaces manual use of spreadsheets and supports data visualization. The technology disclosed provides systems and methods for processing and displaying database objects that build a composite coverage structure capable of representing a complex program of multiple insurance policies or other risk transfer instruments during planning and placement. Reporting from the database of progress against the composite coverage structure and updating objects using a visual interface are described.

17 Claims, 23 Drawing Sheets

(56) References Cited

U.S. PATENT DOCUMENTS

| | | | |
|---|---|---|---|
| 9,038,001 B2* | 5/2015 | Jetter | G06F 17/212 |
| | | | 715/853 |
| 9,154,372 B2* | 10/2015 | Richmond | G06F 17/245 |
| 2002/0194033 A1* | 12/2002 | Huff | G06Q 40/08 |
| | | | 705/4 |
| 2007/0188494 A1* | 8/2007 | Agutter | G06F 17/30554 |
| | | | 345/440 |
| 2013/0110560 A1 | 5/2013 | Syed et al. | |
| 2013/0117654 A1* | 5/2013 | Rosner | G06F 17/30498 |
| | | | 715/227 |
| 2014/0172465 A1 | 6/2014 | Yoder | |
| 2014/0304194 A1 | 10/2014 | Hueler | |
| 2014/0380205 A1* | 12/2014 | Burckhardt | G06F 8/38 |
| | | | 715/762 |
| 2015/0378979 A1* | 12/2015 | Hirzel | G06F 17/5045 |
| | | | 715/220 |

OTHER PUBLICATIONS

PCT/US2016/027630—International Search Report dated Aug. 30, 2016, 3 pages.
PCT/US2016/027630—Written Opinion of the International Searching Authority dated Aug. 30, 2016.
"From Digital Wallflower to Digital Disrupter", Accenture, www.accenture.com/insurance and www.accenture.com/technologyvision, 2014, 40 pages.

* cited by examiner

FIG. 1 Environment

400

| Company ID | 401<br>Name | Short Name | 405<br>PFR Type | 406<br>PFR | 407<br>Company Role Type | Delete |
|---|---|---|---|---|---|---|
| 1 | 410<br>TBD | TBD | S & P Rating | AA | ● ☑ Corporate Insured<br>● ☑ Insurance Carrier<br>● ☑ Reinsurance Carrier<br>● ☐ Insurance Broker<br>● ☐ Reinsurance Broker | ☐ |
| 2 | 420<br>American Internatior | AIG | S & P Rating | AA | ● ☑ Corporate Insured<br>● ☑ Insurance Carrier<br>● ☑ Reinsurance Carrier<br>● ☑ Insurance Broker<br>● ☑ Reinsurance Broker | ☐ |
| 3 | Berkshire Hathaway | BRK | S & P Rating | AAA | ● ☐ Corporate Insured<br>● ☑ Insurance Carrier<br>● ☑ Reinsurance Carrier<br>● ☐ Insurance Broker<br>● ☑ Reinsurance Broker | ☐ |
| 4 | Swiss Re | SWRE | S & P Rating | AAA | ● ☐ Corporate Insured<br>● ☑ Insurance Carrier<br>● ☑ Reinsurance Carrier<br>● ☐ Insurance Broker<br>● ☑ Reinsurance Broker | ☐ |
| 5 | 450<br>Cisco Inc | CSCO | S & P Rating | AA+ | ● ☑ Corporate Insured<br>● ☐ Insurance Carrier<br>● ☐ Reinsurance Carrier<br>● ☐ Insurance Broker<br>● ☐ Reinsurance Broker | ☐ |

FIG. 4

| Tower ID | Tower Name | Buyer Name | Prin.Indem.Type | Prin.Cntrl.LOB | Prin.Terr. | Currency Type | Lyr.Lim. | Lyr. Cvge. Ret. | Attach. Basis | Exp.Date. | Delete |
|---|---|---|---|---|---|---|---|---|---|---|---|
| | 511 | 501 | 502 | 503 | 504 | 505 | 506 | 507 | 508 | 509 | |
| 1 | CSCO-1 | Cisco Inc | Insurance | Product Liability | United States | USD | 1000000.0 | 0.0 | Per Risk | 2015-09-28 | ☐ |
| 2 | CSCO-2 | Cisco Inc | Insurance | Fire | United States | USD | 2000000.0 | 0.0 | Per Risk | 2015-09-29 | ☐ |
| 3 | CSCO-3 | Cisco Inc | Insurance | Flood | United States | USD | 2000000.0 | 0.0 | Per Risk | 2015-09-29 | ☐ |
| 4 | INTC-1 | Intel Inc. | Insurance | Fire | Worldwide | USD | 2000000.0 | 0.0 | Per Risk | 2015-09-29 | ☐ |
| 29 | Casualty Fac Re | American International Group | Facultative Reinsurance | Casualty | United States | USD | 1000000.0 | 0.0 | Per Risk | 2015-12-01 | ☐ |
| 55 | Casualty Fac Re | American International Group | Facultative Reinsurance | Casualty | United States | USD | 1000000.0 | 0.0 | Per Risk | 2015-12-04 | ☐ |
| | | This field is required. Berkshire Hathaway | Insurance | Select One | Insurance | USD | | | Per Risk | 2015-12-04 | Add this data. Add |

570 — This field is required.
580 — Add this data.

FIG. 5

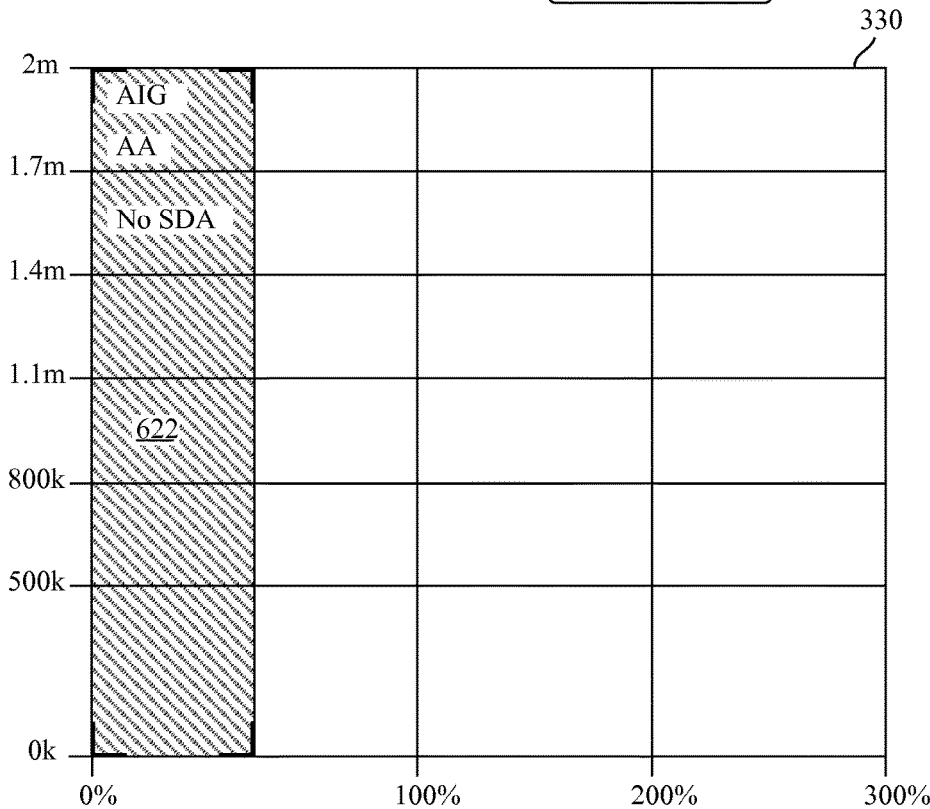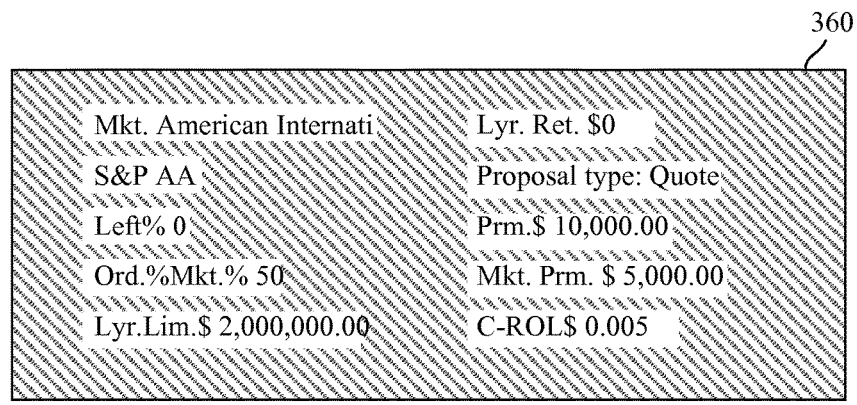
FIG. 6B

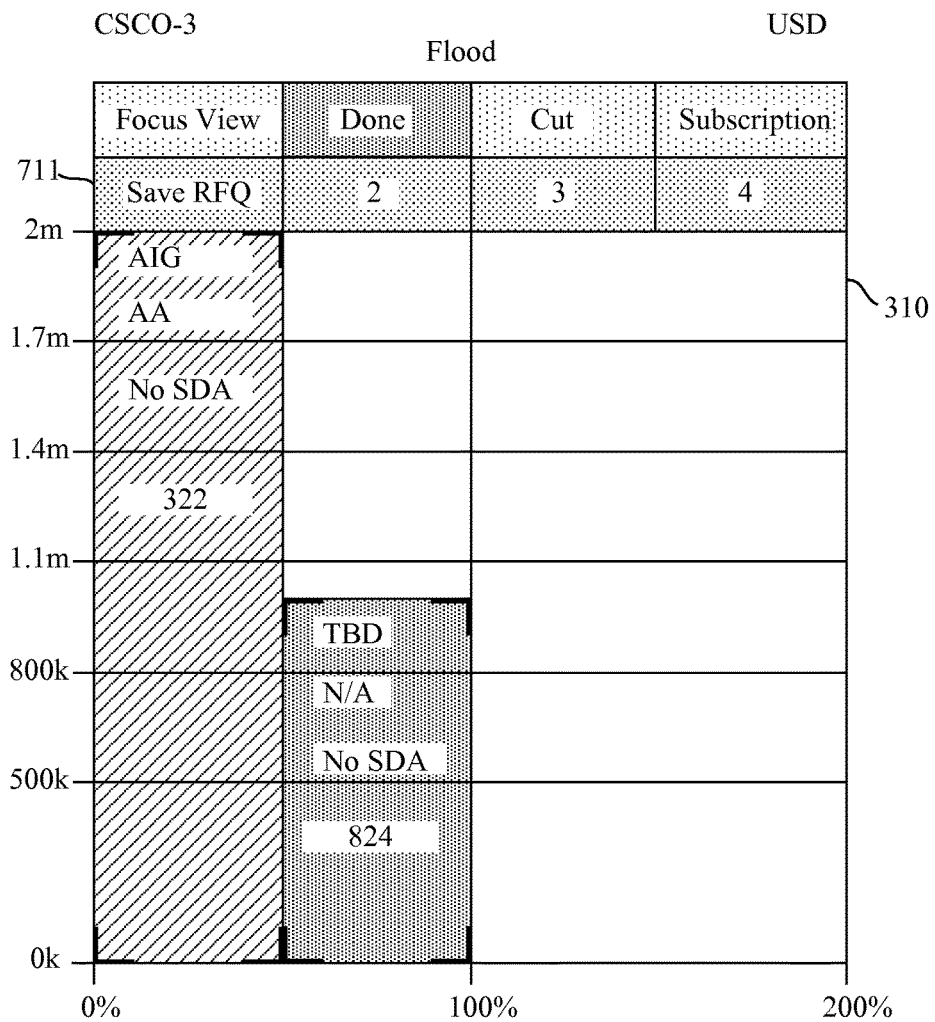
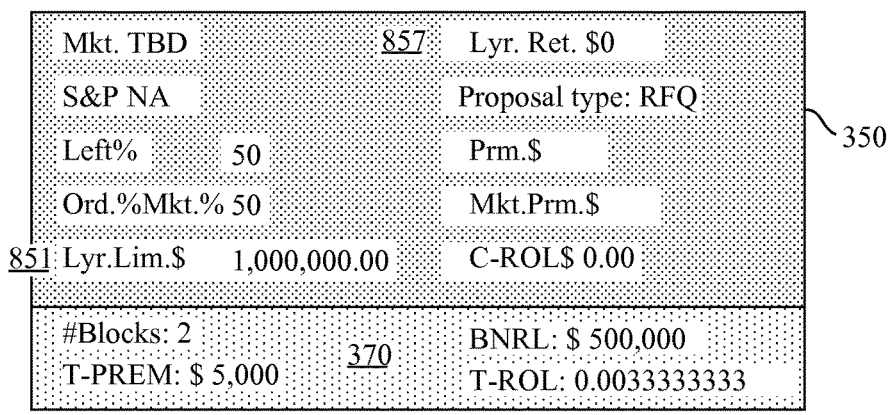
FIG. 8

FIG. 12

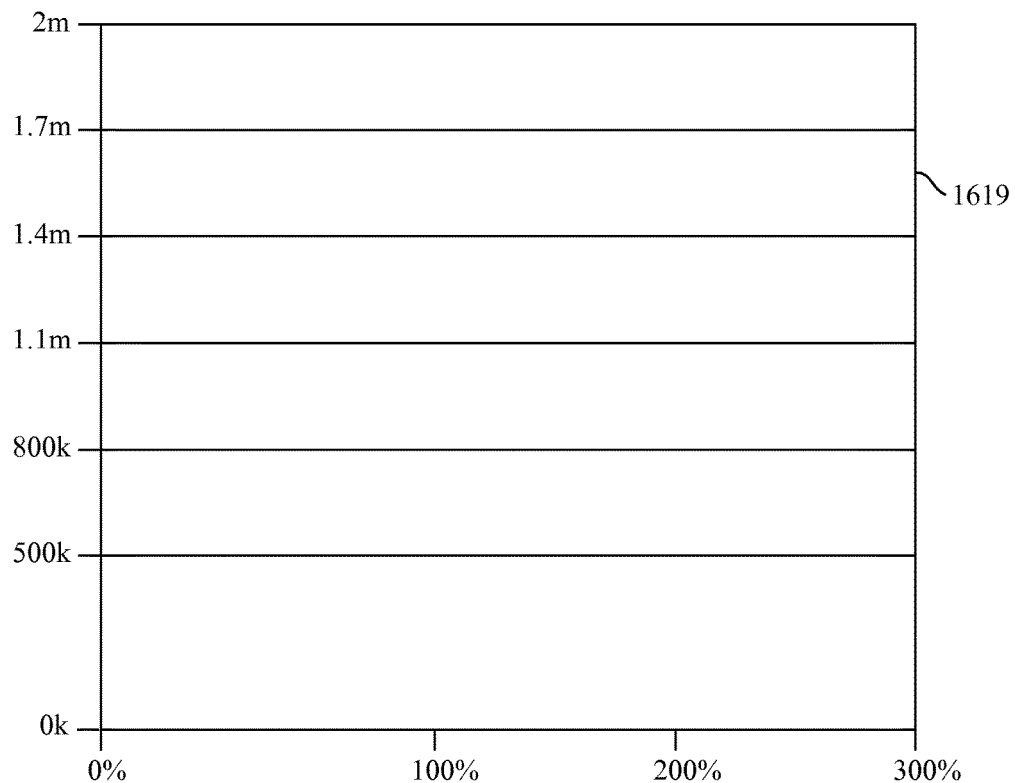
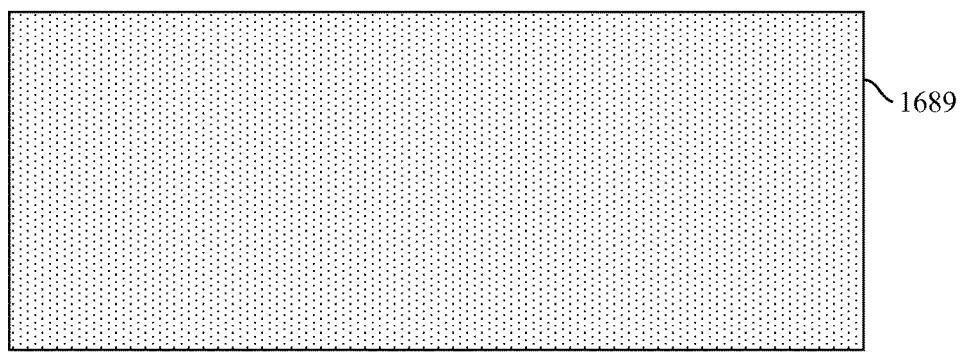
FIG. 16C

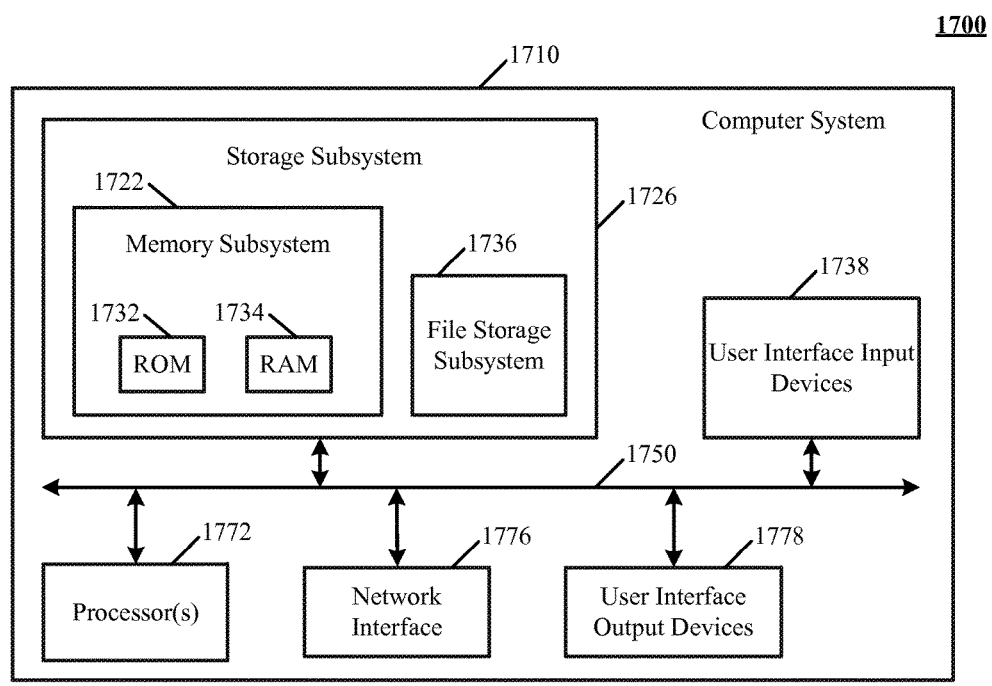
FIG. 17 Computer System

DATABASE SYSTEM AND OBJECT MANIPULATION REPRESENTING PLACEMENT LAYERS AND PARTS

BACKGROUND

The technology disclosed provides systems and methods for processing and displaying database objects that build a composite coverage structure capable of representing a complex program of multiple insurance policies or other risk transfer instruments during planning and placement. Reporting from the database of progress against the composite coverage structure and updating objects using a visual interface are described.

SUMMARY

The technology disclosed provides systems and methods for processing and displaying database objects that build a composite coverage structure capable of representing a complex program of multiple insurance policies or other risk transfer instruments during planning and placement. Reporting from the database of progress against the composite coverage structure and updating objects using a visual interface are described.

Other aspects and advantages of the technology disclosed can be seen on review of the drawings, the detailed description and the claims, which follow.

BRIEF DESCRIPTION OF THE DRAWINGS

FIG. 4 shows a table for entering data that identifies insurers.

FIG. 5 illustrates a table for entering data structures for tower proposals.

FIG. 6B shows insurance quote positioning, along with summary information for the quote, in a GUI.

FIG. 8 shows an RFQ coverage frame object in the canvas of a visual workspace.

FIG. 12 illustrates an entry mechanism for a database table as an interface for details of coverage frame objects within a plan tower structure.

FIG. 16C shows a palette for a visual workspace.

FIG. 17 shows an example computer system used as an information program environment.

DETAILED DESCRIPTION

Figure 1:
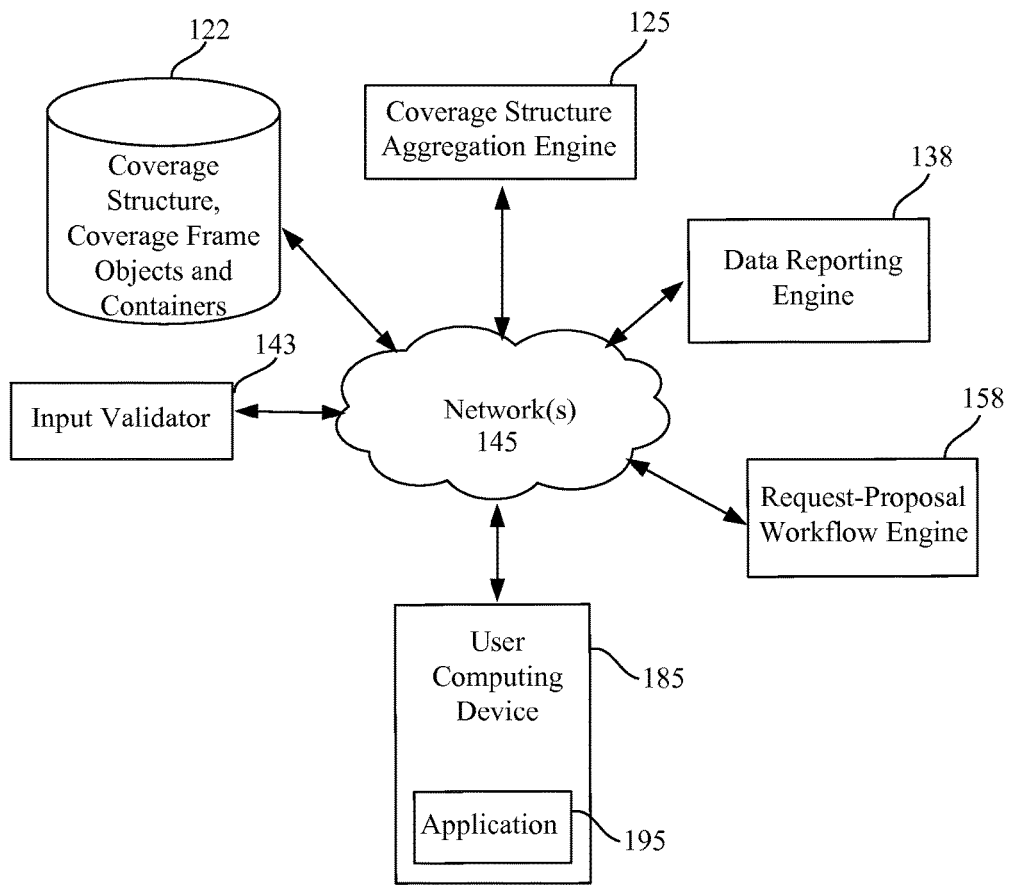
FIG. 1 is a system environment for a special purpose insurance program.

A detailed description of implementations of the technology disclosed is provided with reference to the FIGS. 1-17.

This disclosure begins with an introduction to an industry and to technology disclosed to improve operations, especially during planning and tracking of progress in placement. Seven use cases are described. The first use case is described from the perspective of a system user. The next two cases are from the perspective of the system. The last four cases are from the perspective of special purpose users of the system.

The multi-trillion dollar global property and casualty (P&C) insurance industry is called upon to handle the world's most challenging natural and manmade risks—hurricanes, earthquakes, jumbo jets, supertankers, oil drilling platforms, pandemics, kidnap & ransom, terrorism, mass product torts, cyber liability and countless others. These risks can take the form of commercial insurance policies issued each year to large corporations, or reinsurance contracts negotiated and executed to afford indemnity protection to insurance carriers holding expansive risk portfolios. Coverage buyers will sometimes purchase policies directly from carriers, but most sizable commercial placements are handled by insurance and reinsurance brokers, who possess the necessary expertise to manage these complex transactions.

Many of these high-value risks exceed the capacity that can be securely provided by any single insurance or reinsurance carrier. As a result, large-line risks are commonly subdivided into multiple layers or shares for cession to multiple, selected carriers, and assembled into a complex insurance program that is designed to meet the buyer's original risk management objectives. Already complicated by the involvement of multiple markets, these placements are made even more complex by a number of market factors that tend to increase transactional friction. For example, once a large buyer needs to access global insurance capacity, the assigned broker will require global distribution, and will therefore form correspondent relationships with placing intermediaries in the U.S., Bermuda, London, continental Europe, Asia and other dominant insurance markets. Global distribution can also raise intricate processing issues relating to cross-currency or multi-lingual transactions. As multiple markets respond to deal components, the broker must organize, coordinate and interpret a surge of quotes and coverage terms transmitted by the interested markets. Throughout the placement cycle, clients and brokers face relentless time pressure to place these high-value risks in a timely manner lest a buyer suffer even the slightest lapse in coverage.

In recent years, many commercial brokers have discovered that their long-standing professional expertise in the placement of traditional reinsurance products can no longer fully satisfy a sophisticated buyer's coverage requirements. Seeking additional diversified coverage for low-frequency, high-severity losses caused by windstorms, earthquakes and other natural catastrophes, buyers are increasingly turning to capital market capacity sources in the form of catastrophe bonds (CAT bonds), industry loss warranties (ILWs), catastrophe swaps and other insurance-linked securities (ILS) funded by institutional investors. As a result, a broker assembling a property catastrophe reinsurance tower for a large insurance carrier will need to compare the performance of traditional reinsurance structures against these innovative capital market options.

As it receives and compiles a steady stream of quote-related data from the markets invited to participate in a placement, a placing broker must constantly evaluate and weigh key deal parameters, such as the credit rating and financial security of interested carriers; policy pricing; administrative complexity; and numerous other technical factors. As the placement progresses, brokers will compile transaction data in common spreadsheet and tabular formats, and transmit this information to their clients for review and approval at key stages in the placement process. At critical decision stages (e.g., initial request for quote (RFQ); pre-binder client approval), the broker may prepare a visual representation summarizing the whole risk tower by adapting common spreadsheet or presentation formats (e.g., Microsoft Excel or Power Point) or utilizing generic computerized drawing tools. Broker calculations for key deal metrics such as buyer net retained line (BNRL) or total ceded premium would typically be performed for each key decision point and included as appropriate in any visual representations prepared by the broker for transmittal to the client. Buyers who purchase complex insurance or reinsurance coverages directly from their chosen carriers will use similar processing methods.

Due to the considerable manual processing effort needed to prepare new versions of each visual risk representation, existing graphical tools will typically provide a broker, or a buyer purchasing directly, with only limited ability to update and track placement progress on a real-time, automated basis. Reliance on these cumbersome manual methods can therefore constrain a broker's or buyer's capacity to conduct a concurrent evaluation of alternative placement strategies or re-structure a placement dynamically in response to shifting capacity availability or pricing opportunities in the global marketplace.

The complexities of the placement process can be distinguished from the subsequent back-office processing and administration for bound policies. Once a policy is bound, policy processing is simplified since the participating buyers, markets and intermediaries are known, and the accounting transactions are fully specified.

Introduction to Technology Disclosed

FIG. 1 illustrates a system environment in which the technology disclosed can be practiced. The components illustrate one computer and network implementation. At least one data store 122 holds a variety of data objects. These objects include the composite coverage structure, coverage frame objects and attributes of these objects. The composite coverage structure is also referred to as the plan tower structure. Objects representing aspects of the GUI (graphic user interface) also can be persisted in the data store. GUI elements can include a canvas, palette, controls and information panels. In some implementations, the data store can store information from one or more visual workspaces 300 into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

An input validator 143 receives data that populates attributes of the objects. It validates the data and persists objects with attributes in the data store 122. Input typically is received via a network 145 from a user computing device 185. The user computing device 185 runs at least one application 195. Applications can be a browser, special purpose application, a spreadsheet, or other form completion application. Data can be entered directly for processing by the input validator 143 or can be compiled, for instance in a spreadsheet, and uploaded in bulk. Input data can be translated from another system or format.

Input is handled in various stages of interaction by request-proposal workflow engine 158. As further explained below, some steps precede others, such as the request for quotation typically preceding a quote; or a lead quote typically preceding a following quote. A request-proposal workflow engine can track the status of outstanding requests and maintain threads of related requests and proposals or quotes.

The data reporting engine 138 constructs the GUI to be transmitted for display on the user computing device 185. GUI components are further described below. One component that can be used in the GUI is a report of objects contained within the composite coverage structure. A composite coverage structure (plan tower structure) aggregation engine 125 aggregates, summarizes and reports this information.

Figure 2:
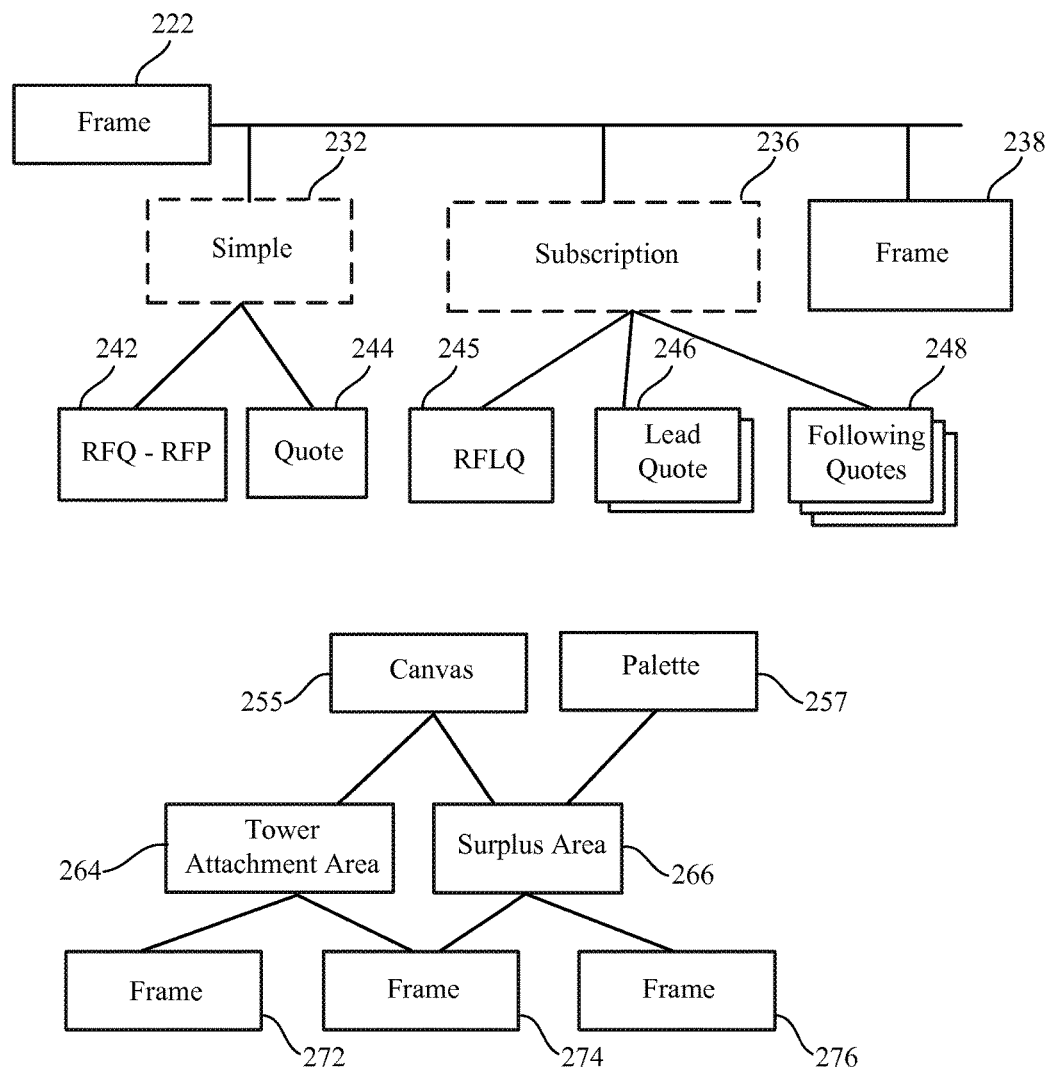
FIG. 2 shows a relationship between insurance instrument objects and a user interface.

FIG. 2 illustrates one structure of objects 200 that can be used to represent insurance policies, other risk transfer instruments and related correspondence. The coverage frame object 222 can be used to implement the nested data relationships described herein. In the figures, "frame" is used instead of the acronym CFO because the acronym has other meanings. A frame 222 can be a simple object 232, a subscription frame 236 or a container for one or more frames 238. Two simple objects are a request for quotation (RFQ) 242 (also referred to as a request for proposal (RFP) in the industry), and a quote 244.

In some placement patterns, multiple participants sign onto a single coverage, insurance policy or other risk transfer instrument. A subscription object is a request for lead quote (RFLQ) 245. The so-called leader sets the terms in interactions with the broker or direct buyer, resulting in a lead quote 246. Other participants sign on for the same terms set by the leader, resulting in following quotes 248. Objects representing the lead quote 246 and following quotes 248 that are part of a single subscription 236 can be contained in a frame 222.

The technology disclosed recognizes interrelationships between objects. A request for quote 242 is linked to the responsive quote 244. The lead quote 246 is linked to its responsive following quote 248. As shown in later figures, a quote 244, a request for modified quote, and ghosting of a modified quote can also be linked.

The technology disclosed also includes visual elements to which frames 222 are linked. A GUI includes a canvas 255, and can include a palette 257. A tower attachment area 264 represents the area within the canvas 255 in which the composite coverage structure is designed. Upon its completion, the composite coverage structure represents the combination of insurance policies or other risk transfer instruments that have been placed and bound to form a complex program. A frame 272 that is within the tower attachment area 264 can represent an RFQ, a quote or a bound policy that has at least temporarily been selected for inclusion in the plan for placement. A frame 276 that is outside the tower attachment area 264 may be a candidate for inclusion or may be retained for information after consideration and rejection. Frames can readily be moved from within the tower attachment area 264 to a surplus area 266 outside the tower attachment area 264. Moving a frame into the tower attachment area 264 at least temporarily selects it for inclusion.

The technology disclosed also allows a frame 274 to straddle a tower share boundary, such as a boundary representing 100% of the risk to be placed. A frame that straddles the tower share boundary can represent partial acceptance of a quote or positioning of an overly large RFQ that needs to be cut and reformulated. Straddling, cutting and automatically formulating RFQs are further discussed below.

The GUI can also include a palette 257 as a separate staging area for frames. Visual separation between a canvas 255 and a palette 257 can be helpful to users. Visually separated canvas 255 and palette 257 configurations are illustrated in several figures. In some implementations, there may not be any visual separation; the canvas may extend across the GUI, with, or without, vertical lines and scaling factors that separate into multiple sections. When used, a palette 257 can provide more space for inventorying quotes than is needed. This can be useful, for instance, when an RFQ is oversubscribed, thereby producing five times as many quote objects as will fit within the tower attachment area.

Figure 3:
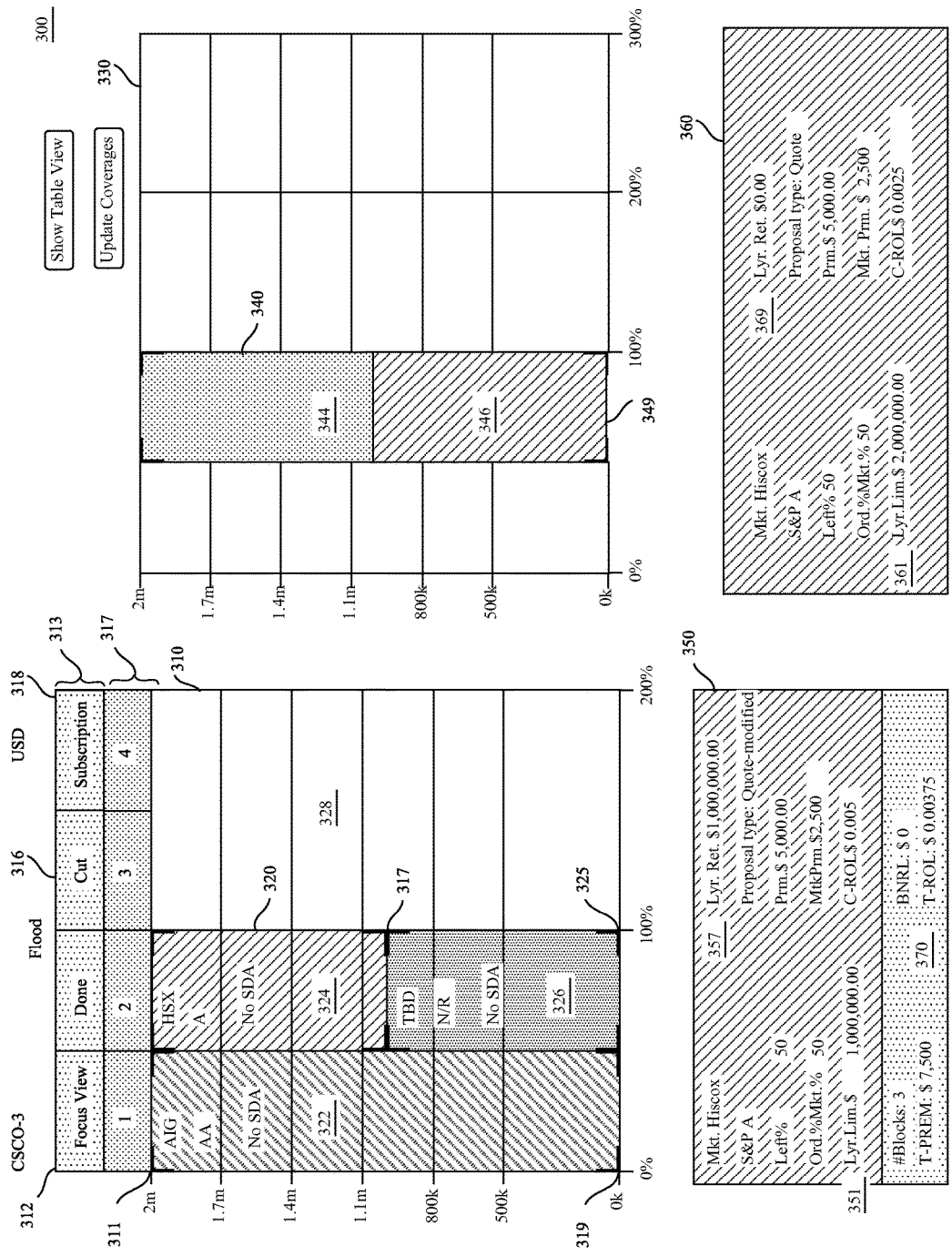
FIG. 3 shows an example GUI interface for a visual workspace.

FIG. 3 illustrates a GUI that uses many features of the technology disclosed. A number of different frame types are illustrated, including a quote 322, a modified quote 324, a request for quote 326, a ghosted representation 344 of the modified quote 324 retained in the tower attachment area 320, and an unused part of a quote 346 remaining after the original quote was cut. These frames are placed on a canvas 310 and a palette 330, but could all be placed on the canvas.

The canvas 310 is divided into a tower attachment area 320 and the surplus area 328. A tower share boundary 325 divides the canvas 310 between the tower attachment area 320 and the surplus area 328. The upper extent of the canvas represents an upper tower boundary 311 to distinguish between boundaries of the canvas 310 and frame objects within the canvas 310. The lower extent of the canvas represents a lower tower boundary 319, which may be a self-insured retention for which a policyholder is responsible or it may be a lower layer of an overall placement plan. The surplus area 328 refers to the area outside the tower attachment area 320, and can include the palette 330. When more than one layer is being placed, each layer can be represented by a separate composite coverage structure. More than one composite coverage structure can be represented on a canvas 310, or separate canvases can be maintained for different layers.

The tower attachment area 320 illustrated by FIG. 3 is bounded by a USD 0 lower tower boundary 319, a USD 2 million upper tower boundary 311 and a 100% tower share boundary 325. Three coverage frame objects are within the tower attachment area 320: a quote 322 from AIG, a modified quote from Hiscox 324, and a request for quote 326 for markets to be determined (TBD).

Within the illustrated canvas 310, the modified quote from Hiscox 324 is currently active, as indicated by the canvas object information panel 350. The canvas object information panel 350 provides details regarding the selected coverage frame object. For the Hiscox object 324, the upper coverage frame boundary is coincident with the upper tower boundary 311, at USD 2 million. The lower coverage frame boundary 317 covers only part of the vertical extent of the tower attachment area 320. Because the difference between the upper frame boundary and the lower frame boundary is USD 1 million, the object is described as having a layer limit of USD 1 million 351 excess a layer retention of USD 1 million 357.

The palette 330 shows staged quotes. The palette object information panel 360 provides details regarding the selected coverage frame object. Within the illustrated palette 330, information concerning the original quote from Hiscox 1255, which is now visually shown as consisting of a ghosted representation 344 of the modified quote 324 and an unused part of a quote 346 remaining after the original quote was cut, is described in the palette object information panel 360.

Use Case #1: 100% Layer Placement for Casualty Insurance Program

After consultation with the insurance buyer for a large corporation, an insurance broker determines that the corporation will require USD 500,000,000 per occurrence limit, 100% share, USD 0 retention casualty insurance coverage for the next account year. Due to the corporation's large capacity needs, the broker believes that the risk to be placed (RTBP) cannot be assumed by a single insurance carrier, and will therefore require placement of multiple, stacked coverage layers. Based on a review of the casualty insurance program for the previous year, the broker further believes that a 100% placement will be most advantageous for the 'USD 75,000,000 x/s (in excess of) 135,000,000 per occurrence' layer for this USD 500,000,000, 100% share, USD 0 retention RTBP. User interaction with the system that assists in this task is described in this use case.

In some of the following discussion, we will reference figures that illustrate the object framework being used, but do not have amounts that match the use case. For use cases that tie the text to the amounts in the figures, please see the second and third use cases.

The broker initially enters USD 500,000,000 as the risk to be placed (RTBP) layer limit, and USD 0 as the RTBP layer retention, in the tower data entry table 500, to enable correct scaling of the visual workspace 300 that includes the tower attachment area 264, the canvas 255 and the palette 257, as described earlier. To prepare to send a request for coverage proposal (RFCP) for the 'USD 75,000,000 in excess of 135,000,000 per occurrence' layer to interested insurance carriers, the broker enters information concerning the RFCP into the coverage data entry table 1200: setting the proposal type to 'RFQ', and entering the coverage layer limit USD 75,000,000, layer retention USD 135,000,000, and risk percentage 100 percent. After the broker enters the RFCP information into the coverage data entry table 1200, and reviews and verifies the accuracy of the information, the broker clicks the 'Update Coverages' button on the coverage data entry table 1200 (or uses functionally equivalent GUI actions) to submit the data. Submitting the data makes it available to create an RFQ coverage frame object that represents the RFCP in the coverage data entry table 1200.

When the broker enters information concerning a coverage proposal into the coverage data entry table 1200 and submits that information, a coverage frame object that visually represents the coverage proposal is created and displayed in its correct vertical position within the palette 330 or canvas 310 of the visual workspace 300. The position of a coverage frame object reflects the coverage limit and retention values of the coverage proposal. Multiple coverage frame objects can be displayed in non-overlapping, adjacent positions within the palette 330 or canvas 310 so that the broker can clearly visualize and review each coverage frame object.

Following review, the broker selects a particular coverage frame object in the palette 330 of the visual workspace 300 by clicking (or using other functionally equivalent GUI user actions) to select and move the coverage frame object to the tower attachment area 320 of the visual workspace 300, for further processing. To analyze a different configuration of coverage frame objects in the tower attachment area 320 of the visual workspace 300, the broker can perform similar operations to move a particular coverage frame object from the tower attachment area 320 to the palette 330. For example, in one GUI implementation, the broker could click on a coverage frame object in the tower attachment area 320 and click again on that coverage frame object to move the selected object to the palette 330 of the visual workspace 300. The broker can click on a 'Focus View' control 312 in the command mode area 313, to obtain an expanded view of the canvas 310.

Figure 10A:
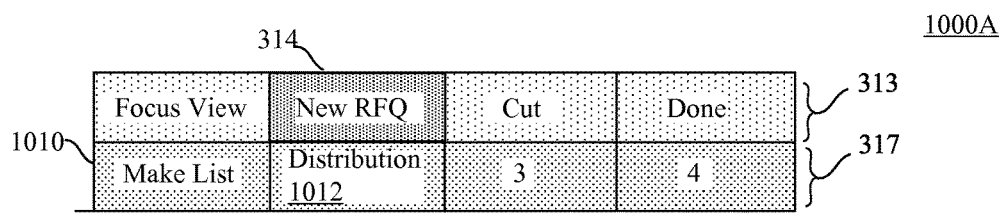
FIG. 10A shows example controls in a context sensitive control area in the canvas of a visual workspace.

The broker can alternatively create an RFQ coverage frame object that represents the RFCP directly in the tower attachment area 320 or the surplus area 328 of the visual workspace 300 by clicking on a 'New RFQ' control 314 shown in in FIG. 10A in the command mode area 313, positioning the cursor in an unoccupied position within the tower attachment area 320 or the surplus area 328, clicking once, then positioning the cursor in a second position within the tower attachment area 320 or the surplus area 328, and clicking a second time (or using other functionally equivalent GUI user actions) to initiate creation of an RFQ coverage frame object directly in the tower attachment area 320 or the surplus area 328. The first click can specify a first point from which to define the new RFQ coverage frame object, and the second click can specify a second point from which to define the new RFQ coverage frame object. Selection of an unfilled rectangular area within the tower attachment area 320 or the surplus area 328, when defining the new RFQ, can result in the system automatically sizing a new RFQ coverage frame object to fill the area. This automatically sized RFQ coverage frame object can be resized.

Once the new RFQ coverage frame object is created and displayed in the tower attachment area 320 or the surplus area 328 of the visual workspace 300, the broker can view detailed RFCP information by selecting and clicking on the frame object (or using other functionally equivalent GUI user actions). The display includes detailed information concerning the RFCP such as the RFCP's limit, retention, risk percentage, and proposal type. In addition, the broker can edit the terms of the RFCP represented by the selected coverage frame object as necessary to re-configure the selected coverage frame object in the visual workspace 300. For example, if the selected RFQ coverage frame object is within the tower attachment area 320, the broker can edit the terms of the RFCP in the canvas object information panel 350, as necessary, to re-configure the selected RFQ coverage frame object. In one implementation, the GUI user actions include positioning the cursor inside the canvas object information panel 350 next to an editable term (for example, layer retention), highlighting the existing value of the editable term, hitting the delete key, entering a new value for the editable term, positioning the cursor outside that canvas object information panel 350, and clicking a second time.

Any such edits affecting the appearance of the RFQ coverage frame object will be reflected in the updated appearance of that coverage frame object in the visual workspace 300. In the described use case instance, the broker is satisfied with the terms of the RFQ coverage frame object as entered in the coverage data entry table 1200, so does not edit the terms of the RFQ coverage frame object. The described GUI user interface details represent one possible option. Other interface options are possible; the examples provided herein should not be taken as definitive or limiting either in scope, context or setting. It will thus be apparent to one skilled in the art that other interface implementations may be practiced.

The broker can also view aggregate statistics concerning one or more coverage proposals represented by coverage frame objects that are completely or partially in the tower attachment area 320, such as the total composite coverage structure premium, the buyer net retained line (BNRL), the composite coverage structure rate-on-line, and the number of coverage frame objects in the tower attachment area 320 or the surplus area 328. Aggregate statistics are automatically displayed in tower information panel 370 of the visual workspace 300. Aggregate statistics are automatically updated as coverage frame objects are moved into or out of the tower attachment area 320 or the surplus area 328. The manner in which the aggregate statistics are calculated, based upon whether a given coverage proposal is completely or partially in the tower attachment area 320, can be changed to be meet the needs of the broker.

Once the broker is satisfied with the terms of the RFCP, and once the RFQ coverage frame object representing the RFCP has been correctly positioned within the tower attachment area 320, the broker can send the RFCP to selected insurers, brokers, or other intermediaries in order to obtain coverage proposals from those selected insurance carriers, brokers, or other intermediaries. The broker clicks on the RFQ coverage frame object in the tower attachment area 320, clicks on the 'Distribution' 1012 control and clicks on the 'Make List' 1010 control in a context sensitive control area 317 shown in in FIG. 10A, which results in columns of abbreviated names of insurers, brokers, or other intermediaries with pick boxes next to those names being displayed in a newly appearing area (not shown) of the visual workspace 300. The broker can then click on one or more of those pick boxes to select one or more insurers, brokers, or other intermediaries to which the broker chooses to distribute the RFCP. When the broker finishes clicking on the pick boxes for chosen insurers, brokers, or other intermediaries, the broker clicks a 'Submit' button (not shown), which results in the closing of the newly apparent area of the visual workspace 300 and in the creation of electronic messages (for example, electronic mail messages) or other forms of documents incorporating the RFCP to be distributed (for example, via the Internet) to the insurers, brokers, or other intermediaries the broker chooses. Alternatively the broker can send an RFCP to selected insurers, brokers, or other intermediaries by using functionally equivalent GUI actions to select a RFQ coverage frame object representing the RFCP in the tower attachment area 320, to specify one or more insurers, brokers or other intermediaries to which the broker chooses to distribute the RFCP, and to create electronic messages (for example, electronic mail messages) or other forms of documents incorporating the RFCP that will be distributed to the selected insurers, brokers, or other intermediaries. In addition, the broker can send an RFCP to selected insurers, brokers, or other intermediaries by entering additional information concerning the RFCP into a modified version of the coverage data entry table 1200, including: selecting the row in the coverage data entry table 1200 corresponding to the RFQ coverage frame object; selecting the insurers, brokers or other intermediaries to which the broker chooses to distribute the RFCP; and initiating creation of the electronic messages (for example, electronic mail messages) or other forms of documents incorporating the RFCP to be distributed to the selected insurers, brokers, or other intermediaries.

As coverage proposals originating from carriers ('quotes') are received, either directly or through a broker or other intermediary, by the placing broker in response to the distribution of the RFCP, the broker enters information concerning each individual quote into the coverage data entry table 1200, including: selecting the 'quote' proposal type; linking information concerning the quote to information concerning the original RFCP; specifying the insurance carrier providing the quote; and entering the premium amount quoted by the insurance carrier. After linking information concerning an individual quote to information concerning the original RFCP, the broker will not need to re-enter the coverage layer limit, layer retention, or risk percentage for that quote, since that quote will be automatically assigned the same coverage layer limit, layer retention, and risk percentage as specified in the information concerning the original RFCP. Once the broker has entered the relevant information concerning one individual quote into the coverage data entry table 1200, the broker may continue entering relevant information concerning other individual quotes, or the broker may proceed to take further actions with regard to the one individual quote whose information has been entered. Once the broker has entered all of the relevant information concerning one or more individual quotes into the coverage data entry table 1200, and reviewed and verified the accuracy of that information, the broker clicks the 'Update Coverages' button on the coverage data entry table 1200 (or uses functionally equivalent GUI actions) to submit the information that has been entered in the coverage data entry table 1200. Submitting the data makes it available to create one or more quote coverage frame objects to represent each individual quote whose information the broker has entered in the coverage data entry table 1200. When the broker submits that information, each such quote is visually represented as a quote coverage frame object displayed in its correct vertical position within the palette 330 of the visual workspace 300.

Once a quote coverage frame object is created and is displayed in the palette 330 within the visual workspace 300, the broker can view detailed information concerning the quote represented by that object by clicking on the quote coverage frame object (or by generating other user actions that would select the object that represents the quote). Selecting the quote coverage frame object will result in the display of detailed quote information. If the broker has entered information concerning multiple quotes and has created multiple quote coverage frame objects, the broker might select one coverage frame object representing one quote, and then select another coverage frame object representing another quote, to compare and contrast the detailed information concerning those respective quotes. Following review, the broker selects a quote coverage frame object that represents a particular quote by clicking on that object (or by generating other user actions to select an object), and moves the selected object to the tower attachment area 320 of the visual workspace 300 for further processing by clicking on the selected coverage frame object again (or by generating other user actions to move the selected object to the tower attachment area 320).

Once a quote coverage frame object is created and is displayed in the tower attachment area 320 or in the surplus area 328 of the visual workspace 300, the broker can again view detailed information concerning the quote represented by that coverage frame object by clicking on that object (or by generating other user actions to select that object), which will again result in the display of detailed information concerning the quote represented by the selected coverage frame object in the visual workspace 300 (for example, in canvas object information panel 350).

Once information concerning multiple quotes received by the broker in response to the distribution of the original RFCP has been submitted, the broker would review and compare these quotes by selecting the RFQ coverage frame object that represents the original RFCP in the tower attachment area 320 (for example, by clicking on the RFQ coverage frame object that represents the original RFCP if that object were already in the tower attachment area 320, or by clicking on that object if it were in the palette 330 to select it, and then moving the selected coverage frame object to the tower attachment area 320 of the visual workspace 300 by clicking on it again), and clicking on a 'Compare' control (not shown) within the command mode area 313 in the visual workspace 300 (or by generating other user actions to select the RFQ coverage frame object that represents the original RFCP in the tower attachment area 320, and examine the original RFCP and compare the quotes responsive to that original RFCP). These actions would result in a re-scaled, nested area (not shown) being displayed in the visual workspace 300, including a re-scaled, nested tower attachment area 320, surplus area 328, and palette 330, all of whose scaling would reflect the coverage layer limit and layer retention of the original RFCP. In one implementation, the nested area would be superimposed upon, and would wholly or partially obscure the canvas 310, palette 330 or other parts of the visual workspace 300. In another implementation, the nested area would be displayed in an unoccupied area of the visual workspace 300. The nested area would allow the user to zoom into the selected RFQ coverage frame object to compare and contrast the information for the quotes responsive to the RFCP. The re-scaled, nested tower attachment area 320 would also contain a nested risk percentage boundary, which would represent the risk percentage of the coverage proposal (in this case, the RFCP represented by the selected RFQ coverage frame object) that determines the scaling of the nested area. Each quote coverage frame object representing a quote whose information has been entered in the coverage data entry table 1200 and linked to information concerning the RFQ coverage frame object representing the original RFCP will be displayed within the palette 330 of the re-scaled, nested area. The broker can select quote coverage frame objects in the re-scaled, nested area by clicking on them one at a time (or by generating other user actions to select them one at a time), which would result in detailed information concerning the quote represented by the selected coverage frame object being displayed in the visual workspace 300 (for example, in the nested palette information panel 360, if the selected coverage frame object were in the nested palette 330). The display of that detailed information would allow the broker to review and compare key coverage metrics, such as insurance carrier credit rating and coverage rate-on-line, of a quote represented by a selected coverage frame object.

In this use case, the broker has received three quotes with premium amounts tightly clustered around USD 900,000, and the broker is therefore persuaded to accept the quote offered by the insurance carrier with the highest credit rating. After further consultation with the insurance buyer of the corporate client, the broker can bind the preferred coverage proposal (in this case, a quote) by clicking on the coverage frame object representing the preferred coverage proposal (in this case, a coverage frame object representing a quote) in the tower attachment area 320 of the visual workspace 300. Clicking on a 'Complete' control (not shown) in a context sensitive control area 317, and clicking on a 'Bind' control (not shown) in a context sensitive control area 317 would result in the creation of an electronic message (for example, an electronic mail message) or other form of document incorporating a notice that the preferred coverage proposal (in this case a quote) had been accepted by the buyer (in this case, the large corporation) that would be distributed (for example, via the Internet) to the carrier (in this case, the insurance carrier) that offered the preferred coverage proposal (in this case, a quote).

The broker could also bind the preferred coverage proposal by generating other user actions to select the coverage frame object in the tower attachment area 320 that represents the preferred coverage proposal, to indicate that the preferred coverage proposal had been accepted by the buyer, and to create an electronic message (for example, an electronic mail message) or other form of document incorporating a notice that the preferred coverage proposal had been accepted by the buyer that would be distributed (for example, via the Internet) to the carrier that had offered the preferred coverage proposal. In addition, the broker could bind the preferred coverage proposal by entering additional information concerning the preferred coverage proposal into the coverage data entry table 1200, including: positioning the cursor in that portion of the coverage data entry table 1200 corresponding to the preferred coverage proposal and clicking on the "bind" pick box (or by generating other user actions to locate the portion of the coverage data entry table 1200 corresponding to the preferred coverage proposal and to initiate a "bind" command), which would result in the creation of an electronic message or other form of document incorporating a notice that the preferred coverage proposal has been accepted by the buyer to the carrier that had offered the preferred coverage proposal.

Once the preferred quote were bound, the BNRL, having been automatically displayed in the visual workspace 300 (for example, in the tower information panel 370) and having been automatically updated from its initial USD 500,000,000 value, would be displayed as a USD 425,000,000 value, reflecting the 100% placement of the original 'USD 75,000,000 x/s 135,000,000 per occurrence' layer. The broker can review the BNRL value, as well as other aggregate statistics regarding coverage frame objects completely or partially present in the tower attachment area 320, which are displayed in the visual workspace 300 (for example, in the tower information panel 370).

Use Case #2: Figures Illustrating Non-Subscription Placement

This use case illustrates system support for user construction of a composite coverage structure from non-subscription coverage frame objects. Three tables depicted in FIG. 4, FIG. 5 and FIG. 12 can be used to set up much of the data that the system converts into database objects and uses to generate data for display. With reference to these figures, we describe a method of setting up data objects. This method is described with respect to a system, such as the one depicted in FIG. 1, and illustrative GUIs, for ease of understanding. Neither the specific hardware depicted in FIG. 1, nor the detail interfaces in these figures, is necessary to the computer implemented method disclosed.

FIG. 4 illustrates an interface 400 for identification of companies. The input validator 143 interacts with the user computing device 185, for instance, transmitting data for display towards the user. This example interface for identification of companies is organized in columns, including the company ID, a company name 401 and short name, a credit rating type 405 and a credit rating 406. Each company can have one or more roles, which are identified in this interface using checkmarks in the company role column 407. The system generates a company ID as rows are added to the table. In some implementations, the user could generate unique company IDs and the system could verify uniqueness before accepting them. In some instances, an object will relate to a request that goes out to several companies. The system accepts input such as "TBD" 410 for certain objects that are not related, or not yet related, to individual companies. The system also could permit input descriptive of a market segment, such as "European reinsurers." The companies identified can be seeking insurance or helping provide insurance. Cisco Inc. 450 is identified as an illustrative sample: a corporate insured with a high credit rating. Some of the other companies identified as illustrative samples, such as American International Group (AIG) 420, provide both insurance and brokerage services. AIG provides both insurance to corporate insureds and reinsurance of other insurers. It also purchases insurance for its operations, and in this role it can be identified as a corporate insured. Once a company has been identified, a database object is created for that company. Many more corporate details can be provided than are illustrated in FIG. 4. Alternatively other systems can be relied on for the provision of company details.

FIG. 5 illustrates an interface for creation of tower proposals used in placement. Tower proposals for both insurance and reinsurance are illustrated. These tower proposals can contain any kind of coverage. Illustrative samples of tower proposals representing three placements for Cisco Inc. 510, 520, 530 involve product liability, fire and flood risks. A tower proposal representing a placement for Intel Inc. 540 involves fire risks. Two illustrative samples of tower proposals for facultative reinsurance of a casualty risk are also shown: for AIG 550, 560. An illustrative sample of a partially completed new tower proposal to contain coverage frame objects for Berkshire Hathaway 570 is shown in the last row, with an Add 580 option. Creation of a new tower proposal initializes the system to generate other user interfaces on request.

The columns in FIG. 5 include a system generated tower ID and a user specified tower name 511. The buyer name 501, principal indemnity type 502 and principal contract line of business 503 are available for user selection. The system generated user interface in this illustration uses pick lists of values that are configured before the GUI is generated. Details of the coverage sought appear in following columns. The placement parameters illustrated in this GUI include principal territory 504, currency type 505, tower layer limit 506, tower layer retention 507, coverage attachment basis 508, and expiration date 509. An additional parameter that could be entered is a risk percentage for the RTBP. This can initially be assumed to be 100%, but can then be adjusted using additional tools that are described below. The data entered using this interface is used to create and modify tower proposals.

Figure 12:
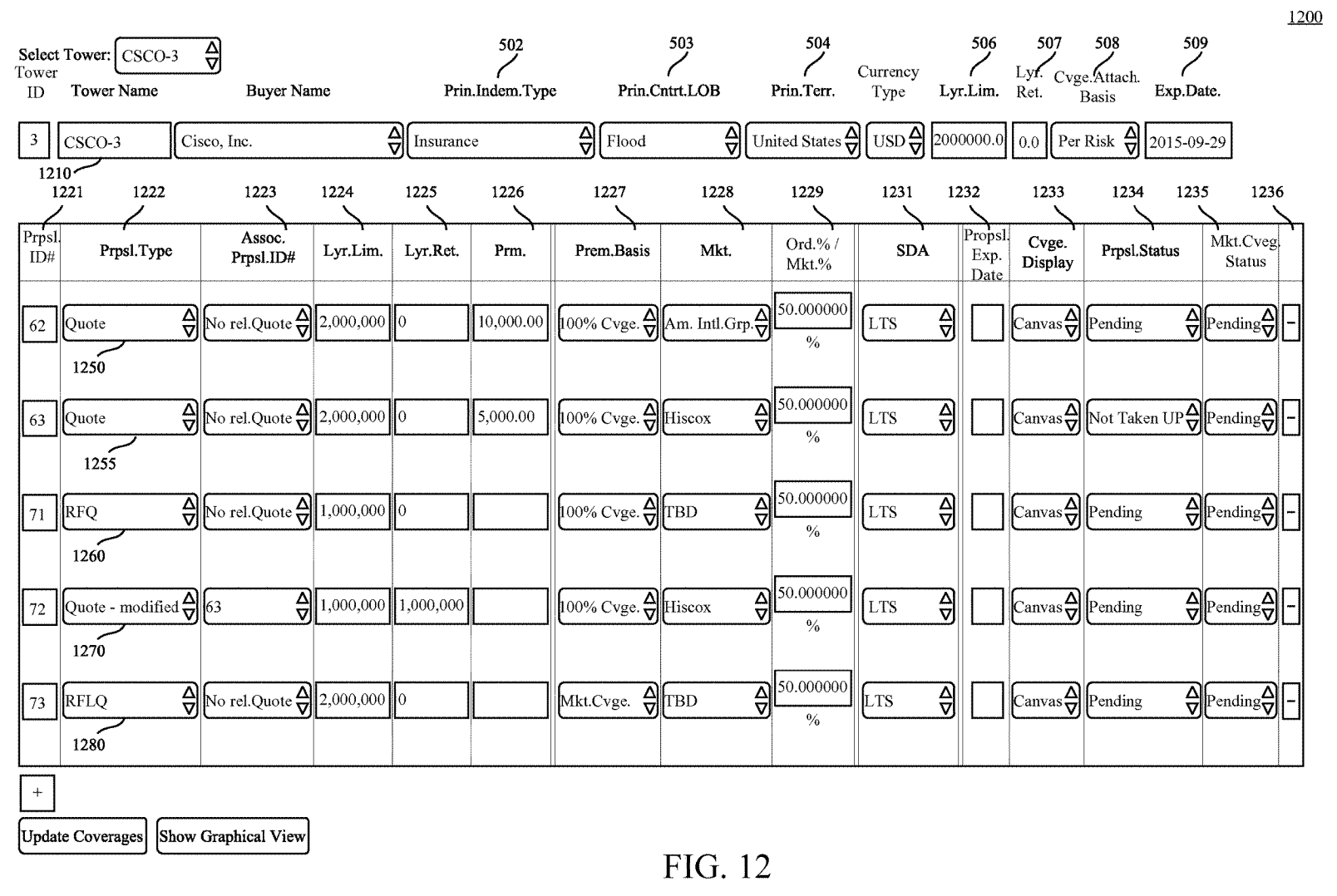

FIG. 12 illustrates an interface for details of coverage frame objects that may be represented graphically within the tower attachment area of a visual workspace 300. Once a particular tower proposal has been selected, in this case the tower CSCO-3, parameters of the tower 1210 are displayed. In this implementation, the parameters displayed match the parameters entered in FIG. 5, and can be modified using controls similar to those in FIG. 5. Attributes of five coverage proposals are shown in rows. The illustrated proposal types include two quotes 1250, 1255, a request for quote 1260, a modified quote 1270 and a request for lead quote 1280. Other proposal types can also be supported. Attributes of each coverage proposal include a proposal ID 1221, a proposal type 1222, an associated proposal ID 1223, a layer limit 1224, a layer retention 1225, a premium amount 1226 expressed in the currency type for the tower, a premium basis 1227, a so-called market 1228, a risk percentage of the layer limit 1229, an SDA parameter 1231, and a proposal expiration date 1232. Among these parameters, the associated proposal ID 1223 links back to a previously created coverage proposal using a proposal ID. For instance, coverage proposal 1270, a modified quote, is linked back to proposal ID 63, which is a quote. Additional figures illustrate the graphic tools for modification of a quote coverage frame object. The modified quote 1270 has a layer limit of USD 1 million excess of a layer retention of USD 1 million, which is the top half of the corresponding quote coverage frame object with proposal ID 63, a layer limit of USD 2 million and a layer retention of USD 0. The layer limit 1224, layer retention 1225, and risk percentage 1229 are automatically translated by the system into coverage frame object visualizations. For instance, in a tower proposal represented by a tower attachment area with a layer limit of USD 2 million and layer retention of USD 0, a request for quote coverage frame object representing request for quote 1260 fills one quarter of the tower attachment area since it represents only half of the tower layer limit (USD 1 million coverage layer limit 1224 versus USD 2 million tower layer limit 506) and only a 50% risk percentage 1229 of the coverage layer limit 1224.

The SDA 1231 specifies the sign-down authority granted to the broker by the market 1228 associated with the coverage proposal. For example, a market 1228 will often grant sign-down authority that authorizes a broker to reduce the initial risk percentage 1229 and bind a smaller coverage share without any further express approval by the market. The market can deny sign down authority by indicating that the line is to stand.

The premium basis 1227 is a useful feature that provides automatic calculations to prevent miscalculation of total premium. Premiums can be stated on the basis of either 100% coverage or on the basis of the percentage of risk that the market covers, such as 50% for the request for lead quote coverage proposal 1280. This automatic calculations feature reduces the risk of understating the premium when a user confuses a partial coverage premium with a 100% coverage premium. The coverage frame object stores both premium and premium basis information, instead of relying on the user to translate between alternative premium bases.

Figure 15:
FIG. 15 shows an example database table of proposal types for an insurance program visual workspace.

Additional attributes automatically processed by the system include coverage display 1233, proposal status 1234 and market coverage status 1235. In some implementations, the coverage display is bifurcated into a canvas 310 and palette 330. The coverage display control 1233 is one way to shift a coverage frame object between different display areas of the visual workspace 300. The proposal status 1234 includes statuses such as pending, accepted, and not taken up. The market coverage status 1235 is used to bind a coverage proposal. Other workflow statuses can also be accommodated. In this figure, quote coverage proposal 1255 from Hiscox was not taken up; instead, modified quote 1270 was generated. In FIG. 15, an example of an accepted lead quote coverage proposal (LQCP) 1550 is shown. As explained for that figure, acceptance of the LQCP precedes a request for so-called following quote coverage proposals. Most of the coverage proposals in these figures have a "Pending" proposal status 1234.

Control 1236 can be used to delete one or more coverage proposals.

When an 'Update Coverages' control is selected, the system receives data updates and revisions. The data store 122 is updated with any changes or additions to the coverage proposals.

This combination of table interfaces generated by the system supports user entry of data that is represented in intuitive form, described analytically in real time, and manipulated graphically with corresponding updates to data objects. This represents a great improvement on prior ad hoc spreadsheet, tabular and presentation forms, and supports more efficient and effective data visualization.

Figure 6A:
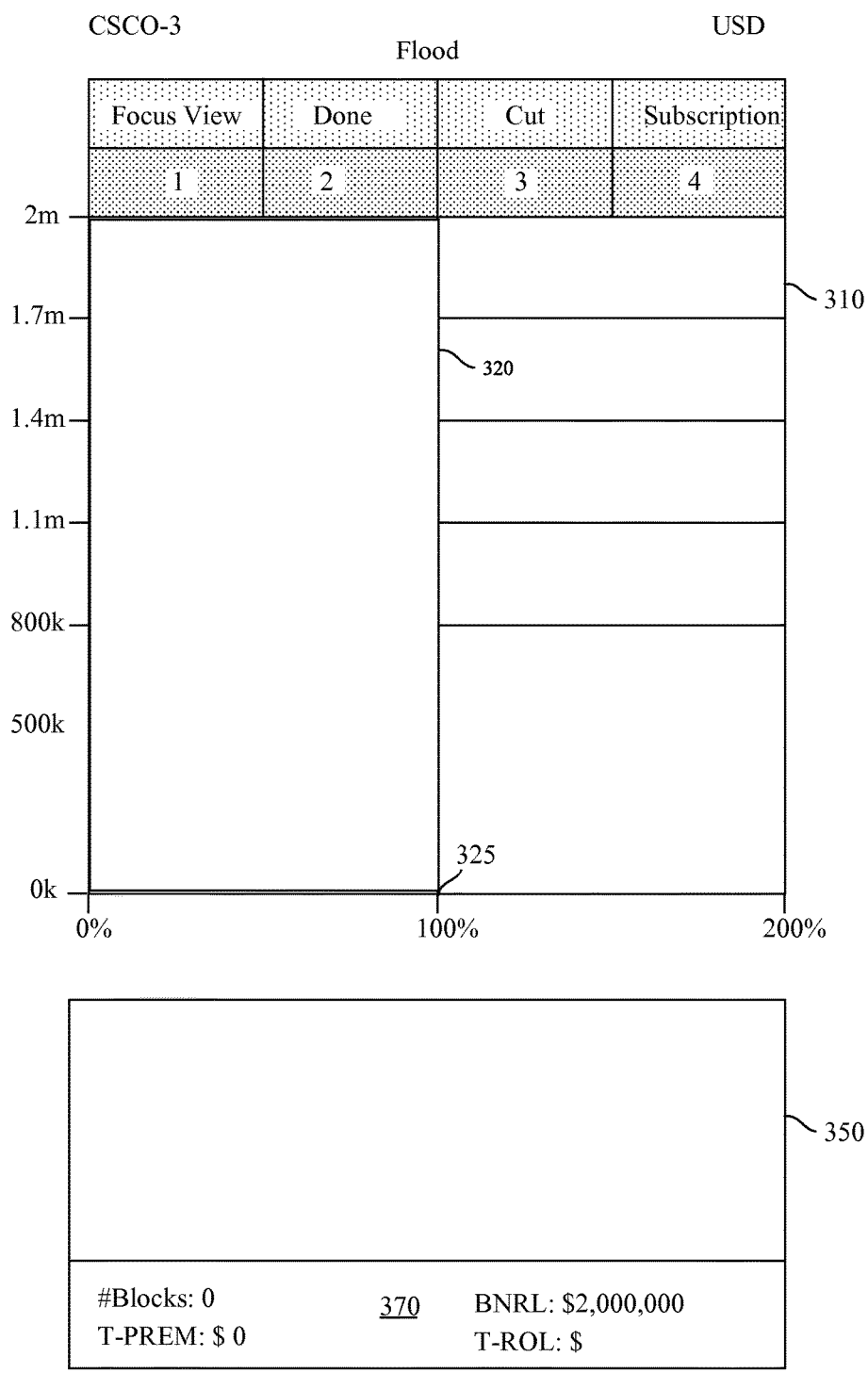
FIG. 6A shows an unoccupied tower attachment area, without interior marking indications for emphasis, in a visual workspace.

FIG. 6A-6B illustrate initial positioning of the sample AIG quote coverage proposal 1250 on the palette 330 as coverage frame object 622. The left (6A) and right (6B) parts of this figure are intended to be viewed in relationship to each other. Some details are easier to see when enlarged across two pages. The coverage frame object 622 on FIG. 6B is described in the palette information panel 360 as representing a quote from AIG for USD 2 million coverage in excess of a USD 0 retention. In this figure, there is only one coverage frame object. More generally, when multiple coverage frame objects are present, the palette information panel 360 provides information for a selected coverage frame object. Because the coverage layer limit and layer retention of the coverage frame object 622 match the tower layer limit and retention of the corresponding tower attachment area 320, the coverage frame object extends from the bottom to top of the palette 330. Half of the distance between the zero and 100% risk percentage share is covered by coverage frame object 622 because that is the risk percentage 1229 of the AIG quote coverage proposal 1250.

FIG. 6A-6B and FIG. 7A-7B illustrate the repositioning of the AIG quote coverage frame object from position 622 (in FIG. 6B) on the palette 330 to a quote 322 position (in FIG. 7A) within the tower attachment area 320. This can be done by simply sliding the AIG quote coverage frame object from the position 622 within the palette 330 into the quote 322 position within the tower attachment area 320. Sliding the coverage frame object can be accomplished by dragging and dropping using a mouse, gesture, voice command or other user interface. During this repositioning operation, the user has the option of placing coverage frame object 322 against the 0% left border of the canvas 310 or anywhere else on the canvas 310, including the surplus area 328. When the object is repositioned from palette 330 to canvas 310, it retains its vertical positioning between the upper tower boundary 311 and the lower tower boundary 319. A cut operation, described in the discussion concerning FIG. 8 and FIG. 10B, can modify a limit or retention and cause generation of a request for a modified quote. A sign down operation can modify a risk percentage of a coverage frame object, sometimes without any requirements for requesting a modified quote, as sign down authority often is provided by the market as part of a quote. In the absence of modifying attributes of a coverage frame object, its size is unchanged and its vertical position within the canvas 310 or palette 330 is unchanged. The system automatically sizes and positions the coverage frame object as the user moves it within palette 330 or canvas 310, or between palette 330 and canvas 310.

Figure 7A:
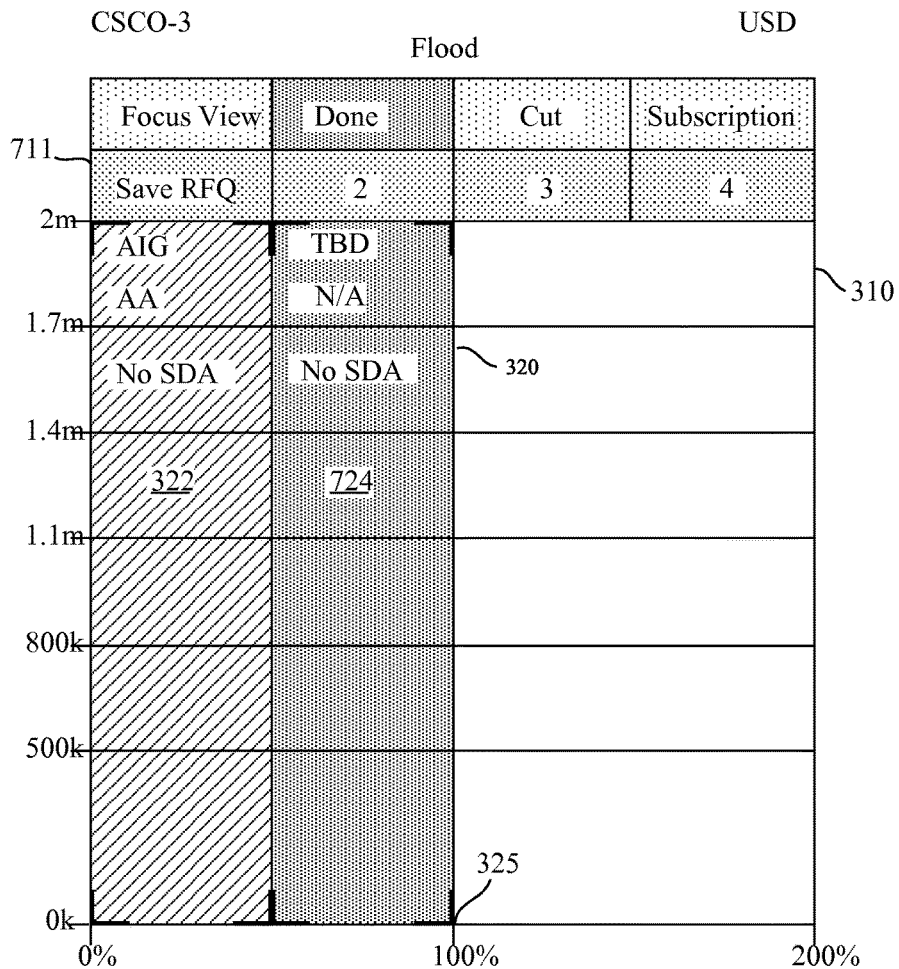
FIG. 7A illustrates creation of an RFQ coverage frame object in a visual workspace.

FIG. 7A further illustrates creation of a request for quote (RFQ) coverage frame object 724. A rubber banding operation can be used, or data can be entered into a table such as illustrated by FIG. 12. Selection of a 'New RFQ' control 314 shown in in FIG. 10A in the command mode area 313 modifies the subcommands listed in the second row, as illustrated in FIG. 7A. Creation of an RFQ rubber banding can be confirmed by selecting the "Save RFQ" control 711. As this RFQ coverage frame object is being created, details are displayed in the canvas object information panel 350. In some implementations, attributes of coverage frame object 724 can be directly edited in canvas object information panel 350, as an alternative to resizing or repositioning the coverage frame object on the canvas 310. The system receives data reflecting the new or updated attributes of the RFQ coverage frame object when the "Save RFQ" control 711 is selected. The system creates or updates the coverage frame object in the data store 122.

Figure 7B:
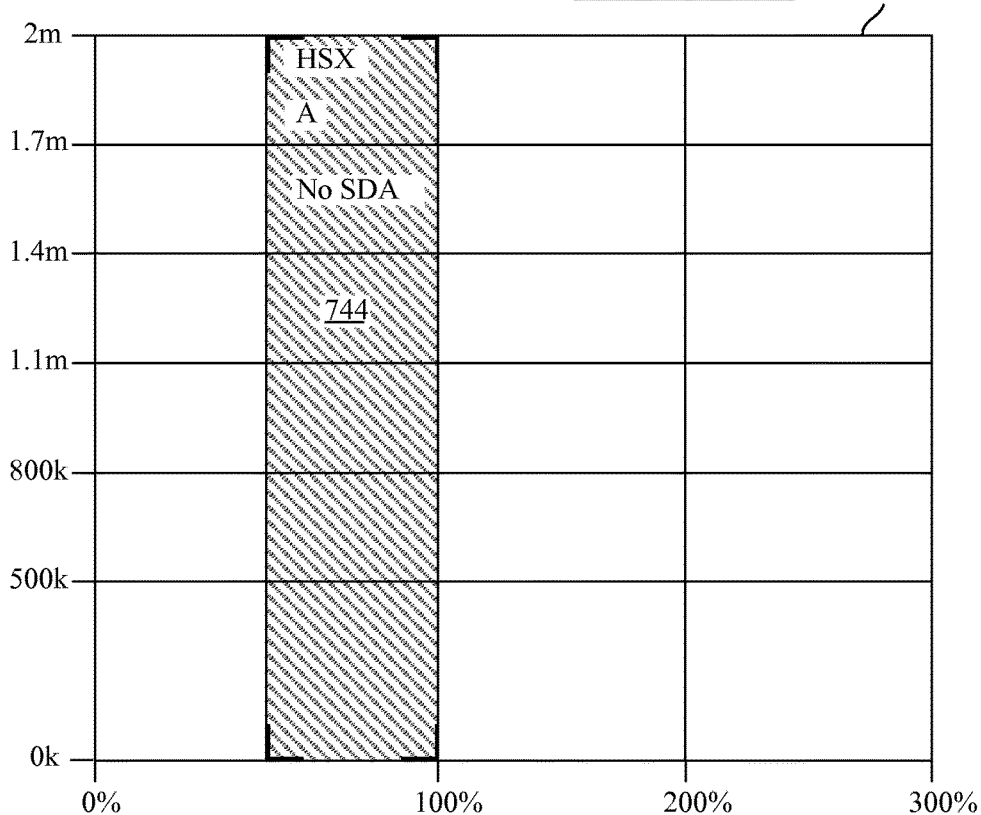
FIG. 7B shows position of a quote coverage frame object in the palette of a GUI.

FIG. 7B shows the positioning of a selected coverage frame object 744 on the palette 330. The layer limit 751 and layer retention 757 match boundaries of the palette 330, so the coverage frame object 744 is the same height as the palette 330.

Figure 9:
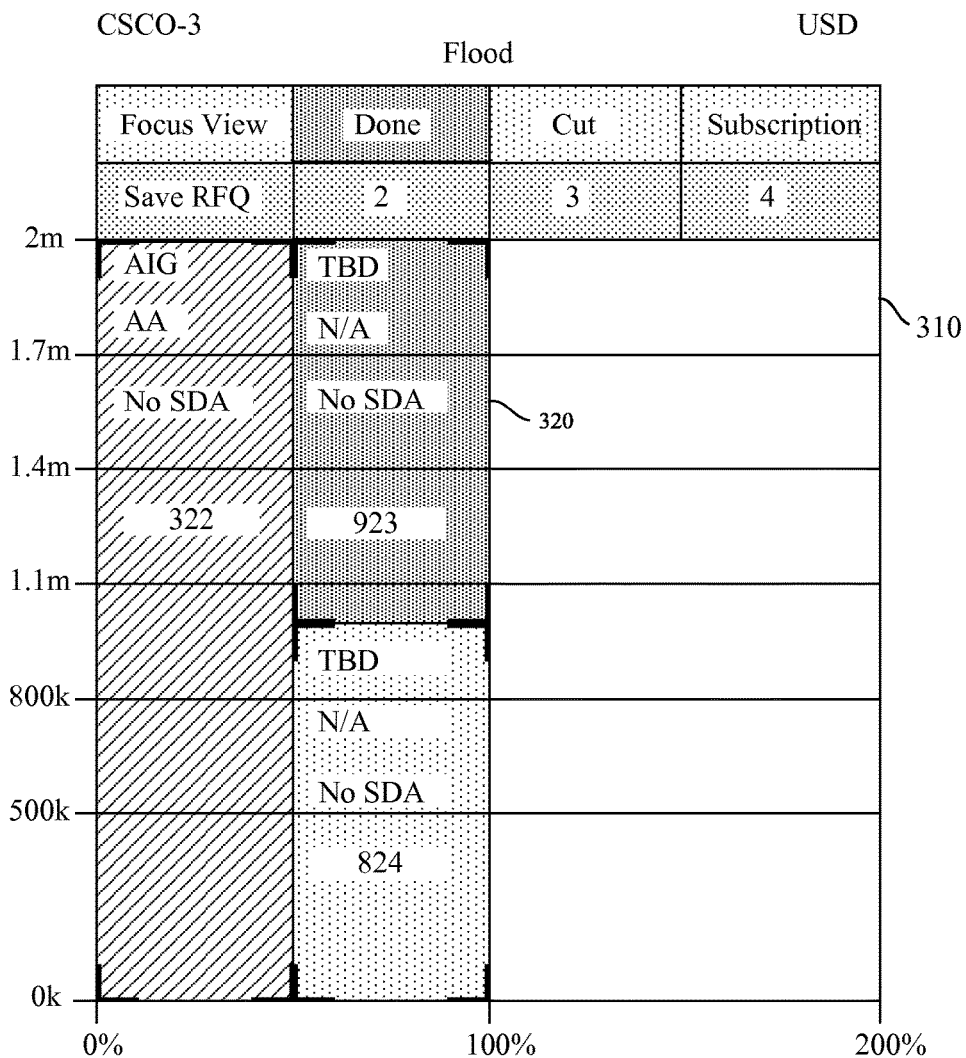
FIG. 9 shows a second RFQ coverage frame object in the canvas of a GUI.

FIG. 8-9 illustrate two steps of creating a pair of request for quote (RFQ) coverage frame objects to replace the single coverage frame object in FIG. 7A. The RFQ coverage frame object 824 in FIG. 8 can be created from RFQ coverage frame object 724 by a drag to resize operation, or by direct modification of the layer limit in the canvas object information panel 350. Coverage frame object 824 is half as tall as coverage frame object 724, because the layer limit 851 is USD 1 million, instead of USD 2 million. This layer limit can be changed by dragging the top of coverage frame object 724 into a position as shown by coverage frame object 824. Alternatively, the layer limit 851 can be manually edited in the canvas object information panel 350. When the "Save RFQ" control 711 is selected, the system receives new or updated information regarding coverage from object 824, and updates a data store 122.

In FIG. 9, a second request for quote (RFQ) coverage frame object 923 is created above coverage frame object 824. Details of RFQ coverage frame object 923 appear in canvas object information panel 350, including the layer limit 951 and the layer retention 957. The layer limit and layer retention of USD 1 million in excess of USD 1 million and the left percentage boundary of 50% correspond to the position of coverage frame object 923 within the tower attachment area 320. The stack of coverage frame objects 923 and 824 represents 50% coverage of the whole tower range from USD 0 to USD 2 million.

FIG. 3, discussed above, illustrates the effects of cutting a quote coverage frame object 744 into parts. After the cut, the retained part of the quote coverage frame object 324 is positioned in the tower attachment area 320 and becomes a modified quote 1270. A ghosted representation 344 of the retained part of the quote coverage frame object 324 and the unused part 346 of the original quote coverage frame object 744 can be stored in the palette 330, away from the tower attachment area 320. In the palette information panel 360, the layer limit 361 and layer retention 369 of the original coverage frame object 744 can be retained. The coverage frame object 340 serves as a container for the ghosted representation 344 of the retained part of the quote coverage frame object; and the coverage frame object 349 serves as a container for the unused part 346 of the original quote coverage frame object 744. The database and system can also link the retained part of the quote 324 back to the original coverage frame object 744, as shown in FIG. 12 for the coverage frame object 1270 in the column for the associated proposal ID 1223.

Figure 10B:
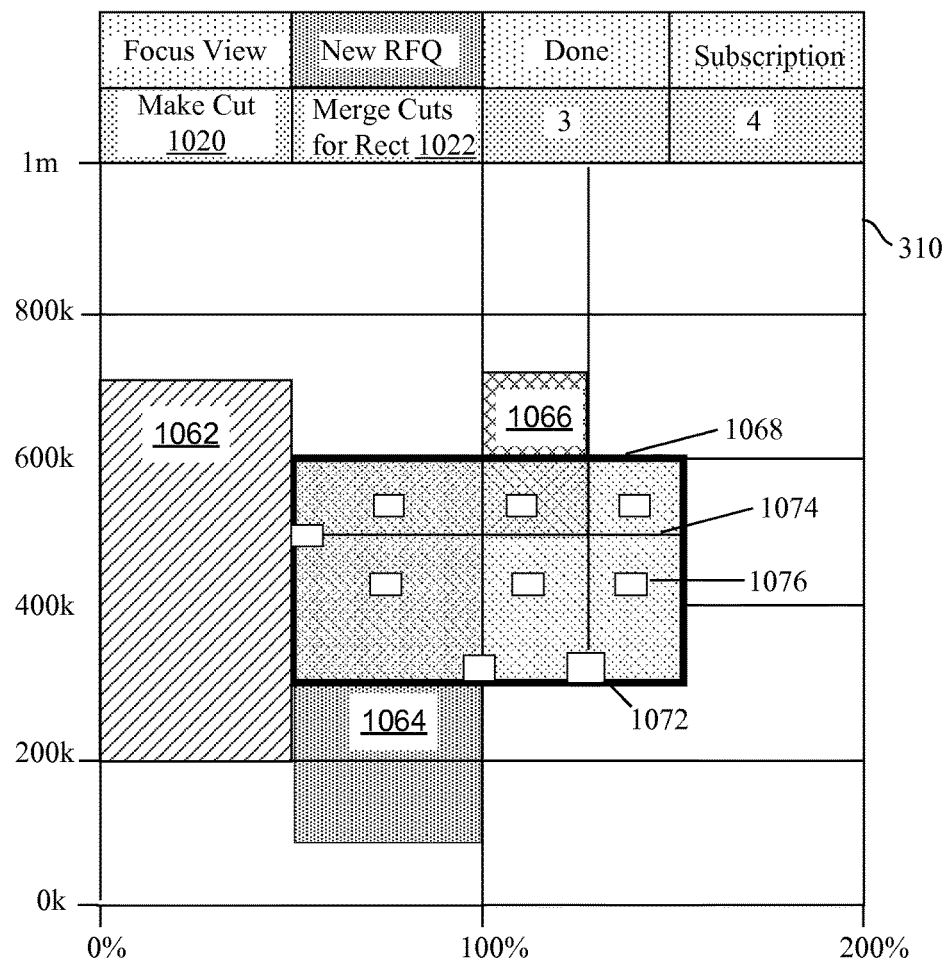
FIG. 10B shows example controls for resizing quotes in a context sensitive control area in the canvas of a visual workspace.

The system assists a user in cutting a coverage frame object as illustrated in FIG. 10B. This figure shows four coverage frame objects 1062, 1064, 1066, 1068 and preparation for cutting of the 1068 object. The 1068 coverage frame object overlaps with, or adjoins, the other coverage frame objects. It could also overlap the tower share boundary 325. When cut mode is activated, the system detects boundaries of the adjoining and overlapping objects, including the tower attachment area, and can create cut line controls 1072, or directly create cut lines 1074. When cut line controls 1072 are created, a user can select the cut line controls to add or remove cut lines 1074. The cut lines and corresponding controls lie on boundaries, such as the right sides of coverage frame objects 1064, 1066, and the bottom of coverage frame object 1066. In this figure, the boundary between 1064 and 1066 is also coincident with the tower share boundary. This interface includes check box 1076 selection of subsections within selected object 1068. Other visual selection cues could be substituted, such as highlighting, bold facing, coloring or other distinctive markings of selected subsections. The system receives a commit signal that indicates selections have been made. The system evaluates the selections and aggregates selected subsections into one or more coverage frame objects. Aggregation creates coverage frame objects that are represented as rectangles that are consistent with insurance industry risk transfer practices. Dog-leg or "L" shaped coverage frame objects could also be constructed, but generation of multiple rectangular coverage frame objects is generally favored over dog-leg or "L" shaped coverage frame objects. Alternatively, a user can manually select subsections to merge, for instance using a pick list. Manual selection can be subject to a requirement that resulting coverage frame objects be rectangular. The coverage frame objects can, for instance, be RFQs, quotes, RFLQs, modified quotes, requests for modified quotes or other types of coverage frame objects. An object that is cut and partially selected can produce a ghosted object representation 344, as discussed in the context of FIG. 3. In addition to system guided cutting, in other implementations, manual cutting by positioning of cut lines could also be supported.

FIG. 3, in sum, illustrates three coverage frame objects that fill a tower attachment area 320. An AIG quote coverage frame object 322 with full limits 319 to 311 and 50% coverage of the RTBP, is positioned at the left edge of a tower attachment area 320 partially defined by a 100% tower share boundary 325. A modified quote coverage frame object 324 sits on top of a RFQ coverage frame object 326, at the right edge of the tower attachment area 320. Both of these coverage frame objects 324, 326 would be expected to progress to quotes and then accepted quotes during the design of the composite coverage structure.

Use Case #3: Figures Illustrating Subscription Placement

This example uses FIG. 11-16 to illustrate a process using subscription coverage frame objects that a user functionally manipulates to complete a composite coverage structure. The subscription coverage frame object represents, for instance, several following markets subscribing to insurance policy terms negotiated with a so-called lead market. In a subscription placement, request for lead quote (RFLQ) 245, lead quote 246, and following quote 248 coverage frame objects can be types of subscription frame objects 236. Both the request for lead quote coverage frame object and request for following quote coverage frame object types can be supported, although the latter is not illustrated in FIG. 2.

Multiple lead quote coverage frame objects can be created and linked to a single RFLQ coverage frame object. In some implementations, multiple lead quote coverage frame objects can be accepted within an RFLQ coverage frame object.

Following quote coverage frame objects can be linked back to at least one lead quote coverage frame object, and can inherit certain terms from the lead quote coverage frame object.

Figure 11:
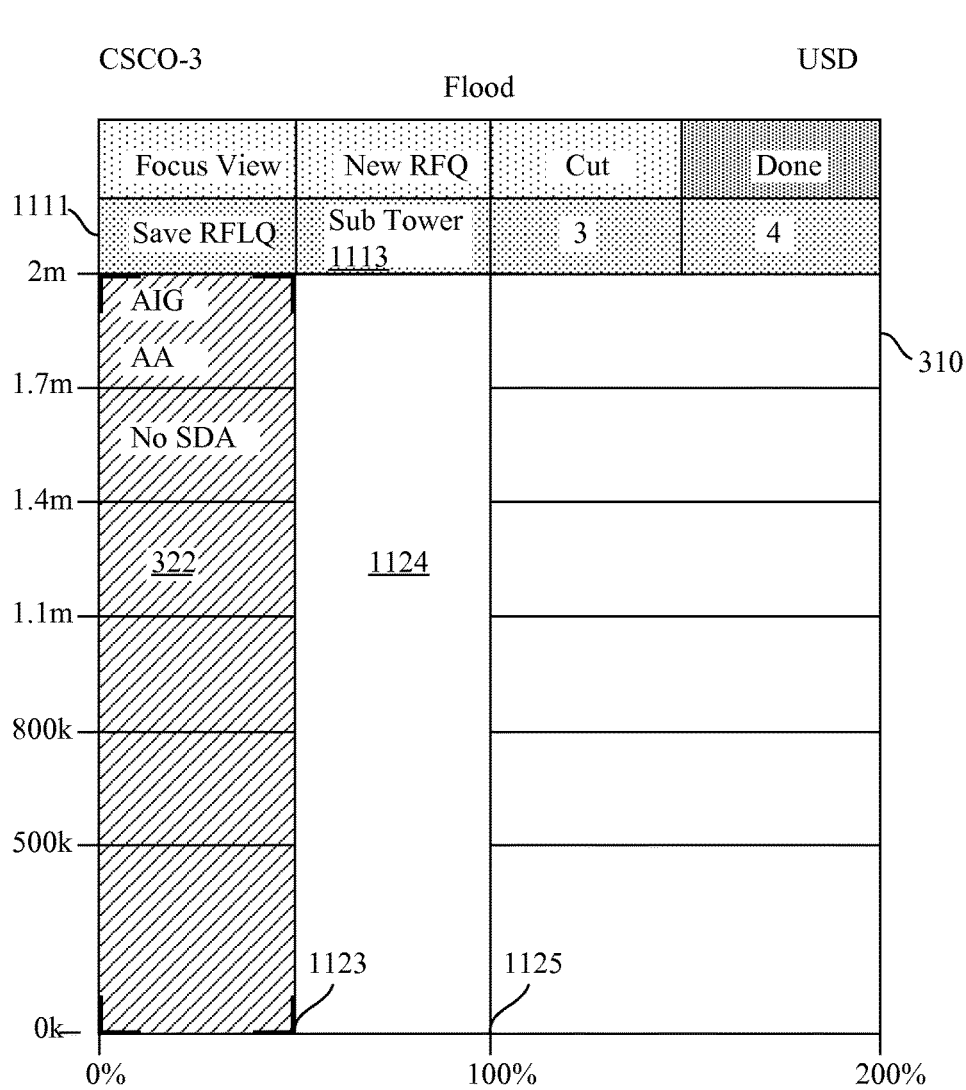
FIG. 11 illustrates subscription controls in an insurance program GUI.

FIG. 11 illustrates an initial step in filling a new subscription tower. The empty subscription tower structure can be created graphically. A user selects the "Subscription" control 318 from the command mode area 313 of FIG. 3, and is presented with the context sensitive control area 1111. A subscription tower can be initialized by selecting the "Sub Tower" control 1113. An RFLQ coverage frame object 1124 representing the subscription tower structure can be created by rubber banding, data entry or other controls. The canvas object information panel 350 provides an interface for a user for directly entering attributes of the RFLQ coverage frame object 1124—for example, its layer limit 1151 and layer retention 1157.

Figure 13:
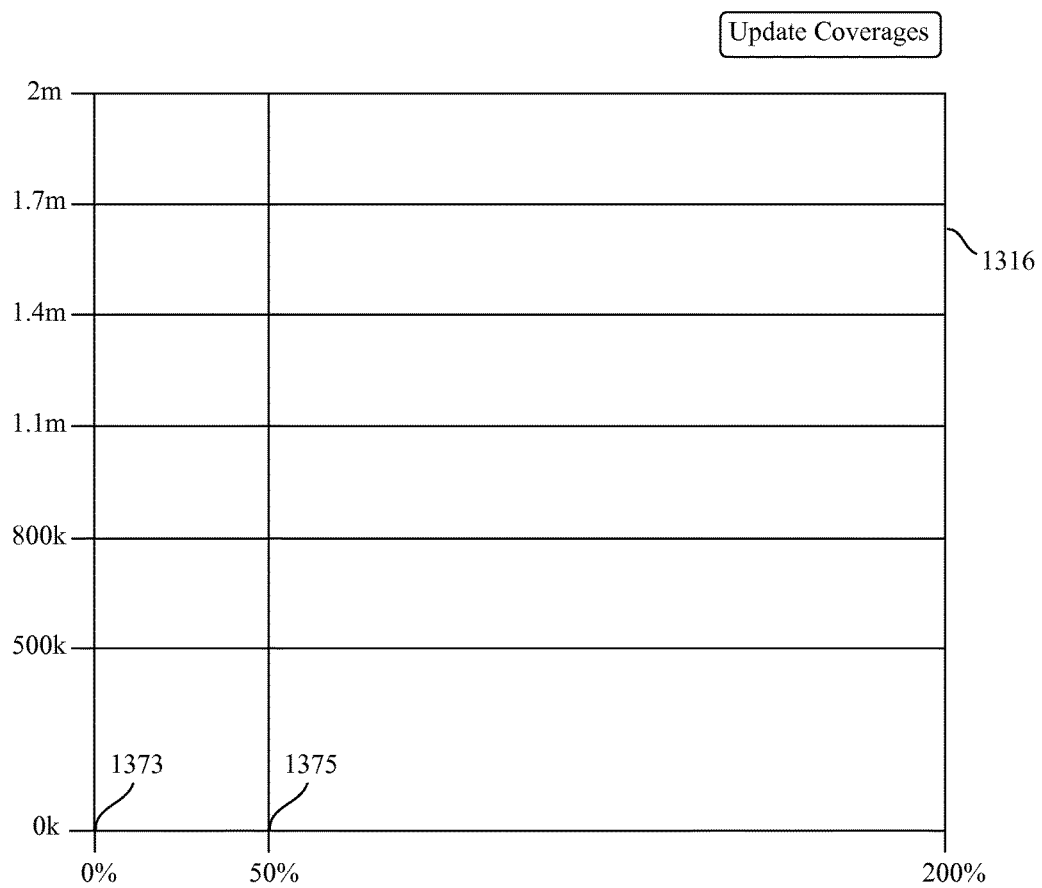
FIG. 13 illustrates subscription share reference lines in an insurance program GUI.

The RFLQ coverage frame object 1124 can be supported by a subscription window or popup that focuses on just frame objects linked to the subscription tower. In one implementation, a subscription window or popup would be superimposed upon, and would wholly or partially obscure the canvas 310, palette 330 or other parts of the visual workspace 300. In another implementation, a subscription window or popup would be displayed in an unoccupied area of the visual workspace 300. FIG. 13 shows an empty RFLQ coverage frame object waiting to be filled within a subscription window or popup within the visual workspace 300. Note that the subscription share between reference lines 1373 and 1375 shown in FIG. 13 is automatically scaled in the visual workspace 300 to match the 50% risk percentage share on the canvas extending from 1123 to 1125 shown in FIG. 11. A subscription window or popup can behave a little differently than the palette 330, focusing on just coverage frame objects related to the RFLQ coverage frame object. A subscription window or popup can have both a subscription canvas and subscription palette. This allows backup lead quotes to be maintained in a subscription palette that is distinct from the regular palette and may be displayed in a separate window or popup or separate division of the same window or popup.

Figure 14A:
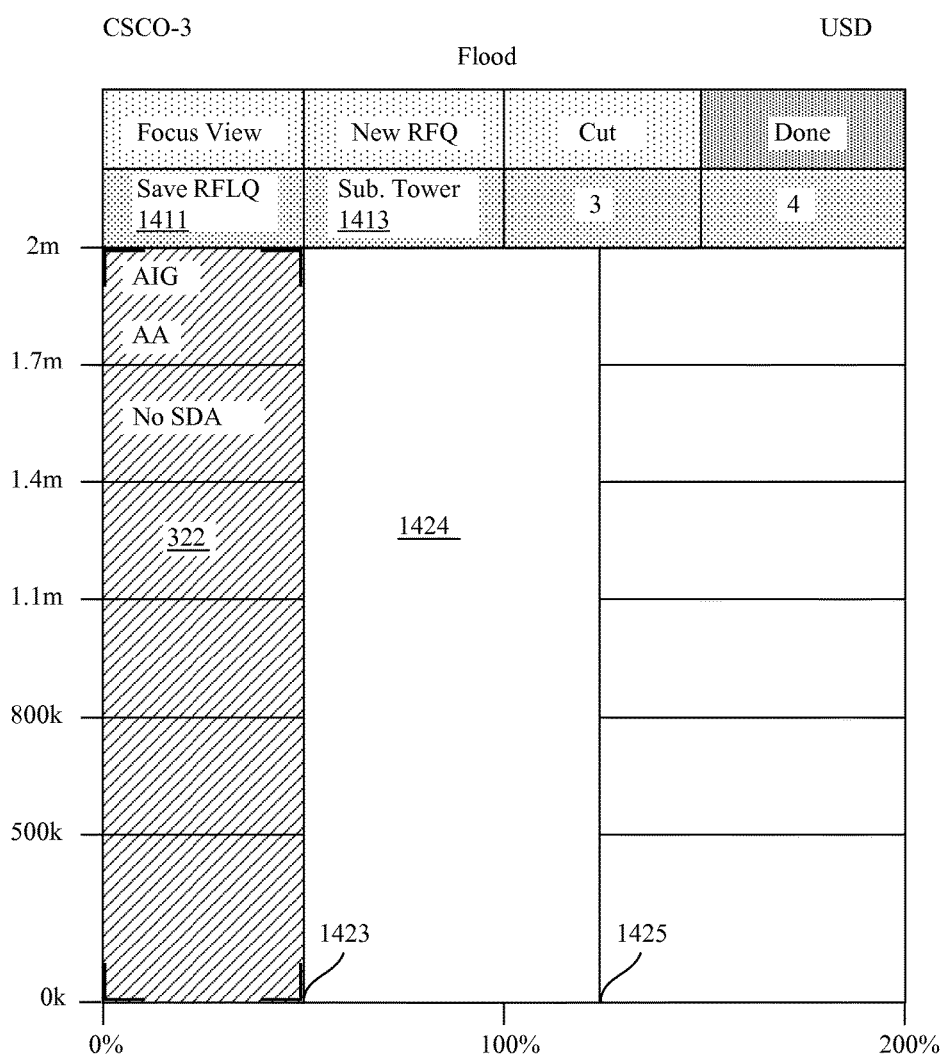
FIG. 14A illustrates subscription controls for an example in an insurance program GUI.
Figure 14B:
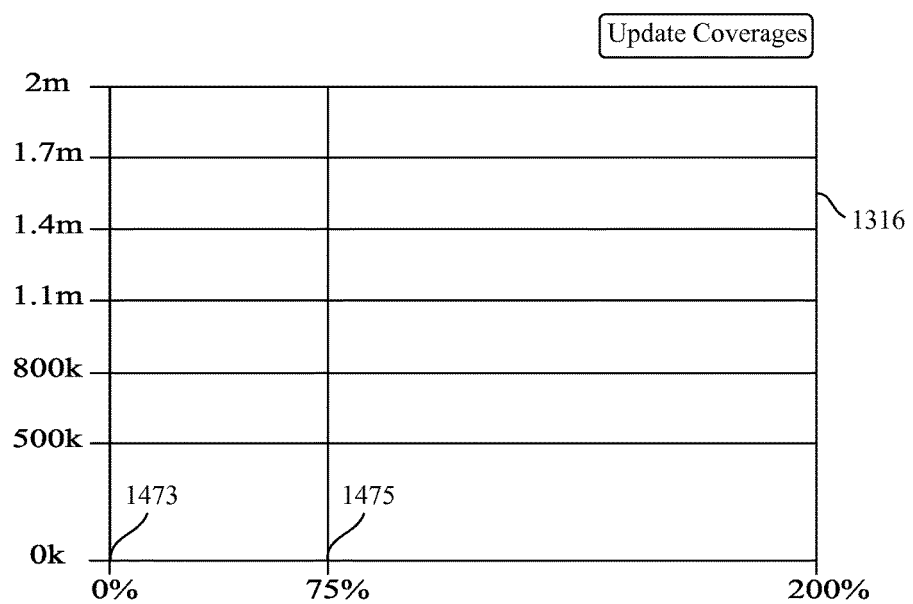
FIG. 14B illustrates subscription share reference lines for an example in an insurance program GUI.

FIG. 14A and FIG. 14B illustrate an example for filling another new subscription tower. The empty RFLQ coverage frame object 1424 can be created graphically, similar to RFLQ coverage frame object 1124 shown in FIG. 11. A user selects the "Subscription" control 318 from the command mode area 313 of FIG. 3, and is presented with the context sensitive second row controls 1411, 1413 shown in FIG. 14A. An RFLQ coverage frame object can be initialized by selecting the "Sub Tower" control 1413. An RFLQ coverage frame object representing the subscription tower structure can be created by rubber banding, data entry or other controls. A subscription information area, not shown in FIG. 14A, could allow a user to directly enter attributes of the RFLQ coverage frame object 1424. The RFLQ coverage frame object 1424 can be supported by a subscription window or popup that focuses on just coverage frame objects linked to the RFLQ coverage frame object. FIG. 14B shows an empty RFLQ coverage frame object waiting to be filled within a subscription window or popup within the visual workspace 300. Note that the subscription risk percentage between reference lines 1473 and 1475 shown in FIG. 14B can be automatically scaled in the visual workspace 300 to match the 75% risk percentage share on the canvas from 1423 to 1425 shown in FIG. 14A, in contrast to the 50% risk percentage share on the canvas extending from 1123 to 1125 for the RFLQ coverage frame object 1124 shown in FIG. 11.

FIG. 15 is a table with subscription coverage proposals that link to a request for lead quote coverage proposal 1280. The columns of this figure are as in FIG. 12. The rows are for a request for lead quote coverage proposal 1280, a responsive lead quote coverage proposal 1550 and a pair of following quote coverage proposals 1560, 1570 that link to and follow certain terms of the lead quote coverage proposal. In this figure, the lead quote coverage proposal 1550 has a status attribute of "Accepted" 1558, which can open the system to solicitation and input of following quotes. By their nature, the following quote coverage proposals depend on and conform to certain terms of a designated lead quote coverage proposal (LQCP) stored in a lead quote coverage frame object.

Figure 16A:
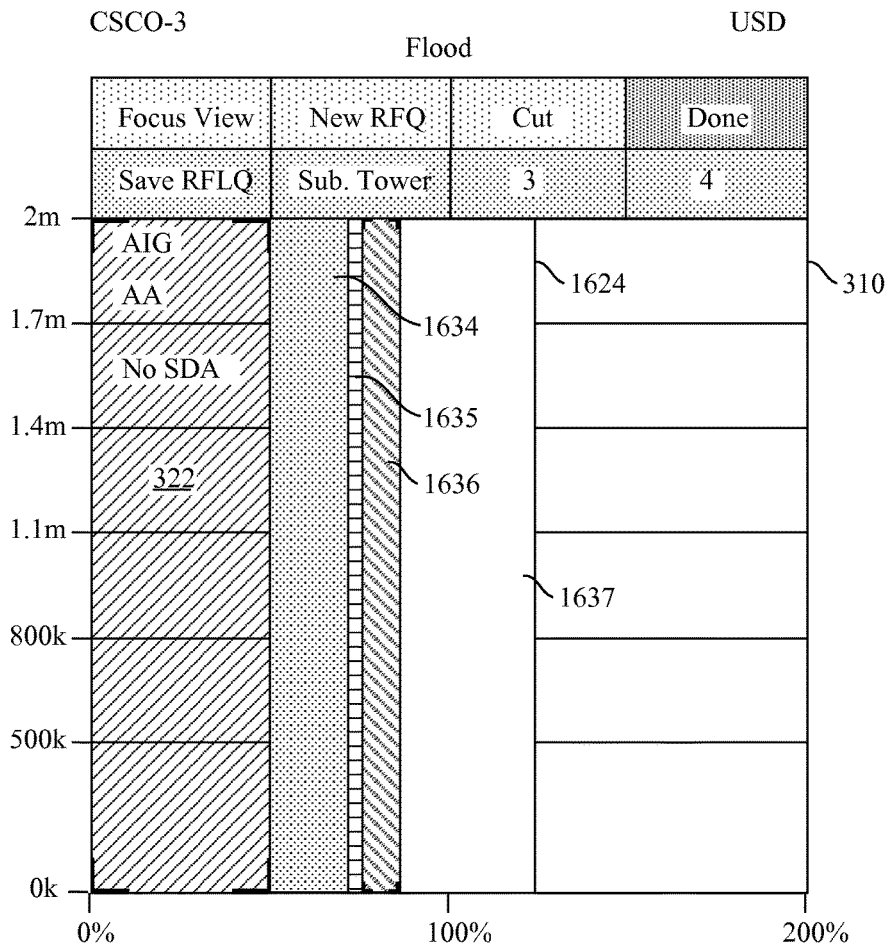
FIG. 16A shows a canvas with a subscription tower alongside a quote coverage frame object in a GUI.
Figure 16B:
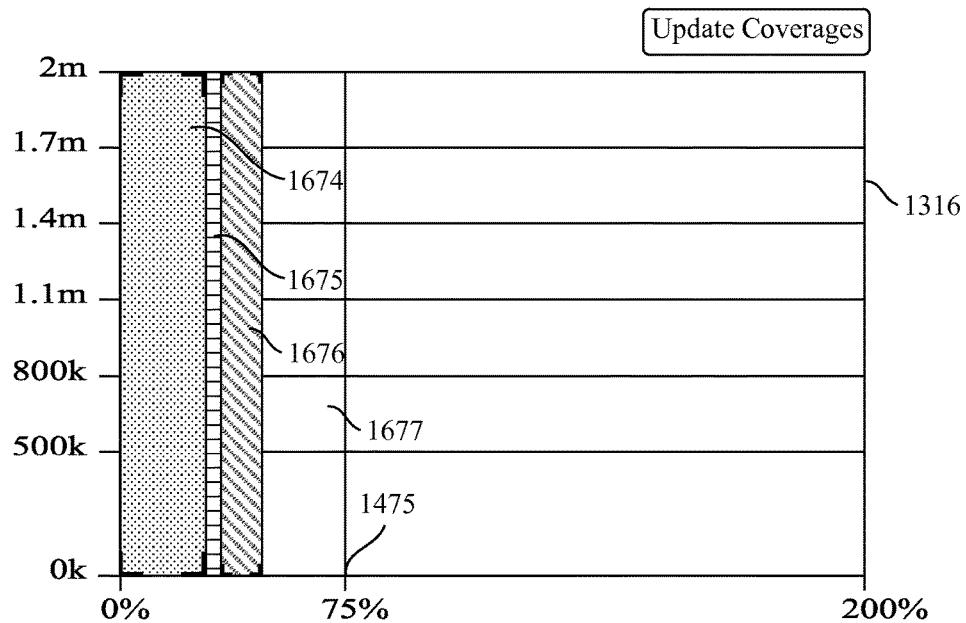
FIG. 16B illustrates subscription shares in an insurance program GUI.

FIGS. 16A, 16B, and 16C illustrate representations of a canvas that includes an RFLQ coverage frame object and of a subscription window or popup that has its own subscription-focused canvas and palette. The subscription coverage frame objects shown represent the request for lead quote coverage proposal, the responsive lead quote coverage proposal and the pair of following quote coverage proposals 1280, 1550, 1560, 1570 described in the rows in the table, FIG. 15.

FIG. 16A is a canvas with an RFLQ coverage frame object 1624 alongside the AIG quote coverage frame object 322. Displayed in the RFLQ coverage frame object 1624 are ghosted representations of three coverage frame objects, 1634, 1635, 1636, previously included in the RFLQ coverage frame object, and a representation of the unfilled portion 1637 of the same RFLQ coverage frame object. Not shown in FIG. 16A is an accompanying palette 330 (see FIG. 3) which might be hidden by a subscription window or popup.

FIG. 16B-16C show the left and right sides of the subscription window or popup, illustrating a subscription canvas 1316, shown in an unfilled state in FIG. 14B, and a subscription palette 1619. In FIG. 16B, the RFLQ coverage frame object has a risk percentage of 75% 1475. The RFLQ coverage frame object can be nested within the tower attachment area or alongside it, as a sibling. A lead quote coverage frame object 1674 is at the left side of the RFLQ coverage frame object. The following quote coverages 1675, 1676 are within the subscription tower attachment area. An unfilled part of the subscription tower attachment area 1677 also is shown. This figure includes a subscription canvas object information panel 1680. The currently active RFLQ coverage frame object on subscription canvas 1316 is the Berkshire Hathaway following quote 1676, so the subscription canvas object information area 1680 shows attributes of that object. In some implementations, an additional subscription tower information panel may be shown, analogous to the tower information panel 370 in FIG. 3. FIG. 16C shows a subscription palette 1619 included as part of a subscription window or popup. A subscription palette object information panel 1689 is blank, because there are not any coverage frame objects on the subscription palette 1619.

Use Case #4: Verticalised Placement for Casualty Facultative Reinsurance Placement The ceded reinsurance department of a large commercial insurance carrier retains a reinsurance broker to place facultative reinsurance coverage for a USD 1,000,000 per occurrence limit, 100% share, varied retention casualty insurance policy recently issued to a large corporation. The insurance carrier further informs the broker that it needs to cede off USD 800,000, 100% share, USD 0 retention of this assumed risk in order to meet its internal risk capital guidelines. Knowing that the carrier's preferred reinsurance carriers will often write a wide range of coverage layers, the broker decides that a verticalised placement allowing quotes for diverse coverage layers will likely offer the best option for the client.

The broker initially enters USD 1,000,000 as the layer limit 506 for the RTBP in the tower data entry table 500 to reflect the entirety of the risk assumed by the insurance carrier in writing the USD 1,000,000 per occurrence, 100% share, USD 0 retention casualty insurance policy. To send a RFCP to interested, qualified facultative reinsurers, the broker enters additional information to create a new tower, selects the newly created tower, and then goes to the coverage data entry table 1200, where the broker creates a coverage frame object to represent the RFCP either by entering information in the coverage data entry table 1200 or by creating a RFQ coverage frame object directly in the tower attachment area 320 of the visual workspace 300 using the methods previously described in "Use Case #1: 100% Layer Placement for Casualty Insurance Program." The resultant coverage frame object, representing the RFCP, gets displayed in the entire area from the indicated USD 0 retention to the indicated USD 1,000,000 limit and from the indicated 0% to the indicated 100% risk percentage within the tower attachment area 320 of the visual workspace 300, since the broker is structuring the placement to entertain reinsurance coverage proposals for any coverage layer of the RTBP.

As quotes originating from reinsurers are received, either directly or through a broker or other intermediary, the placing broker enters information concerning each individual quote coverage proposal into the coverage data entry table 1200, including: selecting the applicable proposal type; linking the quote coverage proposal information to the original RFCP; specifying the reinsurance carrier providing the quote coverage proposal; specifying the coverage layer proposed by the reinsurance carrier (including both the coverage layer limit and layer retention); specifying the risk percentage proposed by the reinsurance carrier; and entering the premium amount quoted for the specified coverage layer and risk percentage. In this example use case, the broker has received the following three quotes in response to its RFCP:
1. quote coverage proposal A: '60% p/o USD 400,000 x/s 100,000 per occurrence @ USD 6,000 Premium'
2. quote coverage proposal B: '60% p/o USD 250,000 x/s 250,000 per occurrence @ USD 3,000 Premium'
3. quote coverage proposal C: '60% p/o USD 500,000 x/s 500,000 per occurrence @ USD 4,800 Premium'

In this case, the broker has also received sign-down authority from the reinsurer making quote coverage proposal B to reduce the 60% risk percentage expressed in quote coverage proposal B without obtaining further permission from the reinsurer provided that the broker does not reduce the risk percentage for any modified version of quote B to less than 30%. Once the broker has entered the relevant information concerning quote coverage proposal A, quote coverage proposal B, and quote coverage proposal C, respectively, into the coverage data entry table 1200, reviewed that information, and verified the accuracy of that information, the broker clicks the 'Update Coverages' button on the coverage data entry table 1200 (or generates other user actions to submit the information that has been entered in the coverage data entry table 1200), which provides the data to create three coverage frame objects representing quote coverage proposal A, quote coverage proposal B, and quote coverage proposal C, respectively, whose information the broker has entered in the coverage data entry table 1200. When the broker submits that information, each such quote coverage proposal is visually represented as a coverage frame object, and each coverage frame object is displayed in its correct vertical position within the palette 330 of the visual workspace 300.

The broker can view detailed information concerning a quote coverage proposal by clicking on the coverage frame object that represents that quote coverage proposal (or by generating other user actions that would select the coverage frame object that represents the quote coverage proposal), which will result in detailed information concerning the quote coverage proposal represented by the selected coverage frame object being displayed in the visual workspace 300 (for example, in the palette object information panel 360 for the palette 330, if the coverage frame object is located in the palette 330). In this case, because the coverage frame object being selected represents a quote coverage proposal, the detailed information that is displayed is more comprehensive than if the coverage frame object being selected were an RFQ coverage proposal (as previously described in Use Case #1). In addition to viewing the layer limit, layer retention, risk percentage, and proposal type of the quote coverage proposal represented by the selected coverage frame object, the broker can also view key coverage metrics concerning the quote coverage proposal, such as carrier credit rating (in this case, a reinsurance carrier credit rating, but when the quote coverage proposal originates from an insurance carrier, an insurance carrier credit rating) and coverage rate-on-line. Those additional key metrics will be displayed with the other detailed information (for example, in the palette object information panel 360 for the palette 330, if the selected frame object is located in the palette 330).

Working in the visual workspace 300, the broker selects coverage frame objects and moves the selected objects from the palette 330 to the tower attachment area 320, or from the tower attachment area 320 to the palette 330 (using the methods previously described in Use Case #1) to improve the potential composite coverage structure for the RTBP based on the client's requirements for net retained line, premium, and reinsurance carrier credit rating. As the broker proceeds, each coverage frame object is displayed in its correct vertical position in the tower attachment area 320, and, provided sufficient unoccupied space exists, is displayed in a non-overlapping position in relation to any other coverage frame objects already present in the tower attachment area 320. In this use case, the broker notes that the coverage frame object representing quote coverage proposal C (offering coverage for '60% p/o USD 500,000 x/s 500,000 per occurrence') can be moved into the tower attachment area 320 without producing any overlap, because there are no coverage frame objects already present in the tower attachment area 320. The broker may select the coverage frame object representing quote coverage proposal C to review detailed information concerning quote coverage proposal C, such as reinsurance carrier credit rating and coverage rate-on-line (for example, in the canvas object information panel 350 for the tower attachment area 320 and surplus area 328). Once the coverage frame object representing quote coverage proposal C is placed in the tower attachment area 320, the BNRL is updated from its initial USD 1,000,000 value to the USD 700,000 value that reflects quote coverage proposal C's offered coverage for '60% p/o USD 500,000 x/s 500,000 per occurrence.' The broker can review aggregate statistics regarding coverage frame objects completely or partially in the tower attachment area 320 (for example, in the tower information panel 370 of the visual workspace 300).

Continuing to work in the visual workspace 300, the broker selects additional coverage frame objects and moves the additional selected frame objects from the palette 330 to the tower attachment area 320. When the broker moves the coverage frame objects representing quote coverage proposal A and quote coverage proposal B into the tower attachment area 320, the broker notes that the sum of the risk percentages for quote coverage proposals A and B exceeds the 100% risk percentage of the RTBP. After selecting and moving the coverage frame objects representing both quote coverage proposal A and quote coverage proposal B inside the tower share boundary 325, which represents the risk percentage of the RTBP, and after aligning the left edge of the coverage frame object representing quote coverage proposal A with the left edge of the tower attachment area 320 and the right edge of the coverage frame object representing quote coverage proposal B with the tower share boundary 325, the broker visually observes that the two coverage frame objects representing quote coverage proposal A and quote proposal B now overlap for a part of the portion of the tower attachment area 320 in the dimension reflecting coverage limit values extending from USD 250,000 to USD 500,000. After comparing the reinsurance carrier credit rating and coverage rate-on-line for quote coverage proposal A and quote coverage proposal B, the broker decides to retain quote A's entire coverage layer offer of '60% p/o USD 400,000 x/s 100,000 per occurrence.'

The broker also decides to perform a cut procedure on the coverage frame object representing quote coverage proposal B to improve the potential composite coverage structure for the RTBP based on the client's requirements. The broker clicks on the coverage frame object representing quote coverage proposal B; clicks on a 'Cut' control 316 in the command mode area 313 in the visual workspace 300; clicks on a suggested subdivision marker that suggests a subdivision of the coverage frame object representing quote coverage proposal B into multiple shares that coincide with the intersection of the coverage frame object representing quote coverage proposal A with the coverage frame object representing quote coverage proposal B; clicks on a pick box that is displayed within a quote-modified coverage frame object that is displayed within the area of the coverage frame object representing quote coverage proposal B that does not overlap the coverage frame object representing quote coverage proposal A; and clicks on a 'Make Cut' control 1020 in a context sensitive control area 317 in the visual workspace 300, which separates the quote coverage frame object representing quote coverage proposal B into two quote-modified frame objects, one of which is a quote-modified coverage frame object in the tower attachment area 320 and one of which is a remainder quote-modified coverage frame object in the palette 330. Alternatively, the broker generates other user actions to select the coverage frame object representing quote coverage proposal B as it overlaps the coverage frame object representing quote coverage proposal A; to subdivide the coverage frame object representing quote coverage proposal B; to select a subdivision of the coverage frame object representing quote coverage proposal B to be separated to eliminate the overlap with the coverage frame object representing quote coverage proposal A; and to separate the coverage frame object representing quote coverage proposal B into two quote-modified frame objects, one of which is a quote-modified coverage frame object in the tower attachment area 320 and one of which is a remainder quote-modified coverage frame object in the palette 330).

Once this cut procedure is finished, the quote-modified coverage frame object in the tower attachment area 320 created from the coverage frame object representing quote coverage proposal B continues to be located in the tower attachment area 320, while the other derivative coverage frame object created by the cut procedure is returned to the palette 330. An enhanced procedure allows the broker to perform multiple, iterative selecting, subdividing, selecting, separating, and returning operations on an original overlapping coverage frame object and the successive derivative coverage frame object with contrasting visual representations that are successively displayed in the palette 330, and further detecting that the quote-modified coverage frame objects of the original overlapping quote coverage frame object are located in the tower attachment area 320 and visually indicating exhaustion of the derivative quote coverage frame object in the palette 330.

If the broker prefers to combine two or more quote-modified coverage frame objects prior to separation as part of a cut procedure (for example, to minimize the number of communications with a carrier), the broker can click on an overlapping coverage frame object; click on a 'Cut' control 316 in the command mode area 313 in the visual workspace 300; click on one or more suggested subdivision markers of the overlapping coverage frame object; click on two or more pick boxes that are displayed within two or more quote-modified coverage frame objects within the overlapping coverage frame object that can be combined to form a rectangle (such rectangular requirement being based on standard business practices for the insurance industry); and click on 'Merge Cuts for Rect' control 1022 in a context sensitive control area 317 in the visual workspace 300; click on a pick box that is displayed within the combined quote-modified coverage frame object formed from the two or more quote-modified coverage frame objects within the overlapping coverage frame object that have now been combined to form a rectangle, before clicking on a 'Make Cut' control 1020 in a context-sensitive sensitive area 317 in the visual workspace 300 (or the broker can generate other user actions to select an overlapping coverage frame object, to subdivide the overlapping coverage frame object in two or more places, to select two or more quote-modified coverage frame objects that can be combined to form a rectangle, to combine two or more quote-modified coverage frame objects that can be combined to form a rectangle, and to select the combined quote-modified coverage frame object, before generating another user action to separate the combined quote-modified coverage frame objects from the overlapping coverage frame object).

Following the subdivision of the coverage frame object representing quote coverage proposal B into the quote-modified coverage frame object and the remainder quote-modified coverage frame object, the BNRL is automatically updated. While the BNRL earlier had a USD 700,000 value when only quote coverage proposal C was positioned in the tower attachment area 320, the BNRL now has a new USD 360,000 value, reflecting the additional presence of both the coverage frame object representing quote coverage proposal A and the newly-created quote-modified coverage frame object in the tower attachment area 320. The broker can review updated aggregate statistics regarding coverage frame objects completely or partially in the tower attachment area 320 in the visual workspace 300 (for example, in the tower information panel 370 of the visual workspace 300).

Noting that all available coverage frame objects that could be used without overlaps have now been used within the tower attachment area 320, the broker concludes that additional reinsurer capacity will be needed to meet the client's desired BNRL of USD 200,000. Looking for opportunities to structure additional coverage proposals, the broker examines the tower attachment area 320 of the visual workspace 300, which provides a visual representation of the remaining, unoccupied parts of the RTBP. Noting a large, unoccupied region towards the top of the tower attachment area 320, the broker creates, directly in the tower attachment area 320 of the visual workspace 300, a new RFQ coverage frame object within that large, unoccupied region, using the methods previously described in Use Case #1, to represent a new '40% p/o USD 500,000 x/s 500,000 per occurrence' RFQ coverage proposal.

Following the creation of this new RFQ coverage frame object 242, the broker re-checks the updated aggregate statistics regarding coverage frame objects completely or partially in the tower attachment area 320 (for example, in the tower information panel 370 of the visual workspace 300). The broker discovers that the BNRL has been reduced from the previous USD 360,000 value to the new USD 160,000 value, which is below the client's preferred target of USD 200,000. The broker edits the terms of the new RFQ coverage frame object in the visual workspace 300 (for example, in the canvas object information panel 350 for the tower attachment area 320 and surplus area 328) to reduce the layer limit for the new RFQ coverage frame object from USD 500,000 to USD 400,000 per occurrence, using the methods previously described in Use Case #1. The broker again re-checks the updated aggregate statistics regarding coverage frame objects completely or partially in the tower attachment area 320 (for example, in the tower information panel 370 of the visual workspace 300). The automatically updated BNRL now shows that the newly modified terms of the new RFQ coverage frame object have enabled the broker to satisfy the client's planning objective for a USD 200,000 BNRL.

As a result, the broker can proceed to send an RFCP specified as '40% p/o USD 400,000 x/s 500,000 per occurrence' to selected reinsurance carriers, brokers, or other intermediaries to finish the verticalised placement. Once the broker is satisfied with the newly modified terms of the newly modified RFCP, and once the newly modified RFQ coverage frame object representing the newly modified RFCP has been correctly positioned within the tower attachment area 320 of the visual workspace 300, the broker can send the newly modified RFCP to selected insurers, brokers, or other intermediaries in order to obtain coverage proposals from those selected insurance carriers, brokers, or other intermediaries using the methods previously described in Use Case #1. The broker can receive additional quotes in response to the newly modified RFCP, enter information into the coverage data entry table 1200 to create new quote coverage frame objects, and select a new quote coverage frame object representing an additional quote responsive to the newly-modified RFCP to bind using the methods previously described in Use Case #1.

After further consultation with its carrier client, the broker can bind quote coverage proposal A, the coverage proposal represented by the quote-modified coverage frame object derived from the coverage frame object representing quote coverage proposal B, quote coverage proposal C, and the additional quote coverage proposal represented by the selected new quote coverage frame object using the methods previously described in Use Case #1.

Use Case #5: Subscription Placement for Property Catastrophe Treaty Reinsurance Program The ceded reinsurance department for a small insurance carrier retains a reinsurance broker to design and place a property catastrophe ("CAT") treaty reinsurance program to protect the carrier's property insurance book of business. Based on a review of the carrier's property CAT program for the previous year and the carrier's risk capital guidelines, the broker designs a treaty reinsurance program providing coverage limits of up to USD 100,000,000, 100% share, varied retention and comprising the following three treaties:

1. 1st Treaty—20% Quota Share Treaty for whole account up to USD 100,000,000 per occurrence
2. 2nd Treaty—Excess Treaty specified as '80% p/o USD 40,000,000 x/s 10,000,000 per occurrence'
3. 3rd Treaty—Excess Treaty specified as '80% p/o USD 50,000,000 x/s 50,000,000 per occurrence'

Since the whole program, and each proposed treaty, will require significant reinsurance capacity, the broker knows each proposed treaty will need to be placed as a separate subscription coverage involving the participation of multiple reinsurers.

The broker initially enters USD 100,000,000 as the layer limit 506 for the RTBP limit in the tower data entry table 500 to enable correct scaling of the visual workspace 300, which includes the tower attachment area 320, the surplus area 328, and the palette 330. The broker then enters information into the coverage data entry table 1200 separately for each proposed treaty. To initiate a subscription-related program, the broker enters the respective coverage limit, retention, risk percentage terms, and a proposal type 1222 of 'RFLQ.' When the broker submits the information, RFLQ coverage frame objects that visually represent subscription frame coverage proposals corresponding to each proposed treaty are displayed in respective correct vertical positions within the palette 330 of the visual workspace 300. Following review, the broker selects and moves each subscription coverage frame object to the tower attachment area 320 for further processing.

The broker can alternatively create a request for lead quote (RFLQ) coverage frame object to represent each RFLQ coverage proposal corresponding to each proposed treaty directly within the tower attachment area 320 by clicking on a 'Subscription' control 318 in the command mode area 313 in the visual workspace 300; clicking on a 'Make RFLQ' control (not shown) in a context sensitive control area 317 in the visual workspace 300; positioning and clicking the cursor in an unoccupied position within the tower attachment area 320 or the surplus area 328; positioning the cursor and clicking in a second position within the tower attachment area 320 or the surplus area 328 (or by generating other user actions to create a subscription coverage frame object directly in the tower attachment area 320).

Once the RFLQ coverage frame object for each proposed treaty is created and displayed in the tower attachment area 320, the surplus area 328, or the palette 330 of the visual workspace 300, and is selected, the broker can view detailed information concerning the RFLQ coverage proposal represented by the selected RFLQ coverage frame object in the visual workspace 300 (for example, in the palette object information panel 360, if the RFLQ coverage frame object is positioned in the palette 330), using the methods previously described in Use Case #1. In addition, the broker can edit the terms of the RFLQ coverage proposal represented by the selected RFLQ coverage frame object in the visual workspace 300, using the methods previously described in Use Case #1. For example, if the selected RFLQ coverage frame object is within the tower attachment area 320, the broker can edit the terms of the RFLQ coverage proposal represented by the selected RFLQ coverage frame object (for example, in the canvas object information panel 350 for the surplus area 328 and the tower attachment area 320) to re-configure the selected RFLQ coverage frame object in the tower attachment area 320.

After the broker creates a RFLQ coverage frame object, the object can be displayed in its correct vertical position in the visual workspace 300 (for example, in the palette 330), or the broker can choose to not display the RFLQ coverage frame object in the visual workspace 300. The broker can choose to edit the terms of the RFLQ coverage proposal represented by the RFLQ coverage frame object via edits to either the coverage data entry table 1200 or the visual workplace 300, using methods previously described in Use Case #1 (see above).

When the broker is satisfied with the terms of the RFLQ coverage proposal, and when the RFLQ coverage frame object representing the RFLQ coverage proposal has been correctly positioned within the tower attachment area 320 of the visual workspace 300, the broker can send the RFLQ coverage proposal to selected reinsurers, brokers, or other intermediaries in order to obtain coverage proposals from those selected reinsurers, brokers, or other intermediaries. This can be done via the visual workspace 300 or via the coverage data entry table 1200. Using the visual workspace 300, the broker can click on the RFLQ coverage frame object representing the RFLQ coverage proposal, click on 'Distribution' control 1012 in a context sensitive control area 317 and click on 'Make List' 1010 in a context sensitive control area 317, which will result in columns of abbreviated names of reinsurers, brokers, or other intermediaries with pick boxes next to those abbreviated names being displayed in a newly appearing area (not shown) of the visual workspace 300. The broker can then click on one or more of those pick boxes to select one or more reinsurers, brokers, or other intermediaries to which the broker has chosen to distribute the RFLQ coverage proposal represented by the selected RFLQ coverage frame object. When the broker finishes clicking on the pick boxes for the selected reinsurers, brokers, or other intermediaries, the broker can click a 'Submit' button (not shown), which will result in the creation of electronic messages (for example, electronic mail messages) or other forms of documents incorporating the RFLQ coverage proposal that will be distributed (for example, via the Internet) to the selected reinsurers, brokers, or other intermediaries; and will result in the closing of the newly apparent area of the visual workspace 300. The broker can alternatively generate other user actions in the visual workspace 300 to send the RFLQ coverage proposal to selected reinsurers, brokers, or other intermediaries in order to obtain lead quote coverage proposals from those selected reinsurers, brokers, or other intermediaries. In addition, the broker can enter information in additional columns (not shown) in the coverage data entry table 1200 to send the RFLQ coverage proposal to selected reinsurers, brokers, or other intermediaries in order to obtain lead quote coverage proposals from those selected reinsurers, brokers, or other intermediaries.

As the broker receives each lead quote coverage proposal (LQCP) originating from a reinsurer, either directly or through a broker or other intermediary, in response to an RFLQ coverage proposal, the broker enters the LQCP information into the coverage data entry table 1200: selecting 'Lead Quote' as the proposal type 1222; linking information concerning the LQCP to information concerning the RFLQ coverage proposal to which the LQCP responded; specifying the reinsurer providing the LQCP; and entering the premium amount and the risk percentage offered in the LQCP. The broker will not need to re-enter the coverage layer limit or layer retention for the LQCP, since the proposal will be auto-assigned the same coverage layer limit and layer retention as the RFLQ coverage proposal to which the LQCP responded. Once the broker enters the relevant information concerning the LQCP into the coverage data entry table 1200, and reviews and verifies the accuracy of that information, the broker can click the 'Update Coverages' button on the coverage data entry table 1200 (or generate other user actions to submit the information), which will provide the entered data to create a lead quote coverage frame object representing the LQCP. When the broker submits that information, the LQCP will be visually represented as a lead quote coverage frame object displayed in its correct vertical position within the palette 330 of the visual workspace 300.

Once the broker receives and enters the relevant information concerning a sufficient number of LQCPs, responsive to a particular RFLQ coverage proposal, to warrant further analysis, the broker can review and compare those LQCPs using methods similar to those described in Use Case #3, including the use of a subscription window or popup having both a subscription canvas and a subscription palette. To focus upon the LQCPs responsive to that particular RFLQ coverage proposal, the broker can position the RFLQ coverage frame object representing the RFLQ coverage proposal in the tower attachment area 320; click on that RFLQ coverage frame object; click on a 'Subscription' control 318 in the command mode area 313; and click on a 'Sub. Tower' control 1113 in context sensitive control area 317 (or by generating other user actions to select the RFLQ coverage frame object representing the RFLQ coverage proposal). These actions will result in a re-scaled, nested area being displayed in the visual work space 300, including a re-scaled, nested tower attachment area, surplus area, and palette, all of whose scaling reflect the coverage layer limit, layer retention, and risk percentage of the RFLQ coverage proposal represented by the selected RFLQ coverage frame object. A subscription window or popup having both a subscription canvas and subscription palette, as described in Use Case #3, can be used for the re-scaled, nested area. FIG. 16B-16C show the left and right sides of a subscription window or popup, illustrating a subscription canvas 1316, shown in an unfilled state in FIG. 14B, and a subscription palette 1619. Each lead quote coverage frame object representing a LQCP whose information is entered in the coverage data entry table 1200 and linked to information concerning that particular RFLQ coverage proposal will be displayed within the subscription palette 1619 of the re-scaled, nested subscription area.

The broker can click on the lead quote coverage frame object representing each LQCP to review and compare key coverage metrics, such as carrier credit rating, coverage rate-on-line, or carrier risk percentage (for example, in the subscription palette object information panel 1689). Using this detailed information, the broker can carefully weigh the carrier credit rating, coverage rate-on-line, and carrier risk percentage for each LQCP before choosing to accept a LQCP.

Once the broker selects a LQCP to accept, the broker can click on the lead quote coverage frame object representing that LQCP; move the selected coverage frame object from the subscription palette 1619 to the subscription tower attachment area within the subscription canvas 1316 (using the same types of methods as those described in Use Case #1); and click a 'Submit' button, which changes the proposal status from 'Pending' to 'Accepted' for the selected and moved lead quote coverage frame object, and closes the re-scaled, nested area of the visual workspace 300. The broker could alternatively generate other user actions to perform the actions described here. The broker could alternatively select and accept a LQCP by changing the proposal status 1234 for the coverage proposal represented by the selected and moved coverage frame object from 'Pending' to 'Accepted' in the coverage data entry table 1200.

After a LQCP has been chosen and its status changed to 'Accepted', whenever the applicable coverage frame object is selected and the applicable re-scaled, nested subscription area is displayed in the visual work space 300, the coverage frame object representing that accepted LQCP will be displayed in the subscription tower attachment area of the re-scaled, nested subscription area of the visual workspace 300. In addition, if the applicable RFLQ coverage frame object is selected and moved (for example, within the tower attachment area 320, or between the tower attachment area 320 and either the surplus area 328 or the palette 330), then that accepted lead quote coverage frame object will be moved with the applicable RFLQ coverage frame object as a single unit.

Following selection of an accepted lead quote coverage frame object for a particular RFLQ coverage proposal corresponding to a particular proposed treaty, the broker can create a request for following quote (RFFQ) coverage frame object to facilitate distribution of a RFFQ coverage proposal to selected reinsurers, brokers, or other intermediaries in order to obtain following quote coverage proposals for that accepted LQCP. The broker can click on the RFLQ coverage frame object in the tower attachment area 320 that represents that particular RFLQ coverage proposal corresponding to that particular proposed treaty, click on a 'Subscription' control 318 in the command mode area 313 in the visual workspace 300, and click on 'Make RFFQ' control (not shown) in a context sensitive control area 317, which will result in columns of abbreviated reinsurers', brokers', or other intermediaries' names with pick boxes next to those names being displayed in a newly appearing area (not shown) of the visual workspace 300. The broker can then click on one or more of those pick boxes to select one or more reinsurers, brokers, or other intermediaries to which to distribute a RFFQ coverage proposal for the accepted LQCP. When the broker finishes clicking on the pick boxes for the chosen reinsurers, brokers, or other intermediaries, the broker can click a 'Submit' button (not shown), which will result in the creation of a RFFQ coverage frame object that represents the RFFQ coverage proposal, and will close the newly apparent area of the visual workspace 300. The RFFQ coverage proposal will now include a premium per unit of risk percentage equal to the premium per unit of risk percentage of the accepted LQCP, and the RFFQ coverage proposal will now be distributed to the selected reinsurers, brokers, or other intermediaries in order to obtain following quote coverage proposals for the accepted LQCP. The broker can alternatively generate other user actions to create a RFFQ coverage frame object to facilitate distribution of a RFFQ coverage proposal to selected reinsurers, brokers, or other intermediaries in order to obtain following quotes for that accepted LQCP.

In addition, the broker can create a RFFQ coverage frame object to facilitate distribution of a RFFQ coverage proposal to selected reinsurers, brokers, or other intermediaries in order to obtain following quote coverage proposals for that accepted LQCP by entering information concerning the RFFQ coverage proposal into the coverage data entry table 1200. This information includes: selecting the 'RFFQ' proposal type; linking the information being entered to information concerning the accepted LQCP; and specifying one or more selected reinsurers, brokers, or other intermediaries to receive distribution of a RFFQ coverage proposal for the accepted LQCP. The broker will not need to re-enter the coverage layer limit, layer retention, or premium per unit of risk percentage for the RFFQ coverage proposal, since the RFFQ coverage proposal would be auto-assigned the same coverage layer limit and layer retention, and the same premium per unit of risk percentage, as the accepted LQCP. Once the broker enters the relevant information concerning the RFFQ coverage proposal into the coverage data entry table 1200, and reviews and verifies the accuracy of that information, the broker can click the 'Update Coverages' button on the coverage data entry table 1200 (or generate other user actions to submit the information), which will provide the data to create an RFFQ coverage frame object that represents the RFFQ coverage proposal. After the broker creates a RFFQ coverage frame object, the RFFQ coverage frame object can be displayed in its correct vertical position in the visual workspace 300 (for example, in the palette 330). The broker could also choose not to display the RFFQ coverage frame object in the visual workspace 300.

The broker can edit the terms of the RFFQ coverage proposal represented by the RFFQ coverage frame object using the methods previously described in Use Case #1 (see above).

When the broker is satisfied with the terms of the RFFQ coverage proposal, and when the RFFQ coverage frame object representing the RFFQ coverage proposal is correctly positioned within the tower attachment area 320 of the visual workspace 300, the broker can send the RFFQ coverage proposal to selected reinsurers, brokers, or other intermediaries in order to obtain coverage proposals from those selected reinsurers, brokers, or other intermediaries using the methods previously described concerning the sending of a RFLQ coverage proposal in this use case.

As each following quote coverage proposal (FQCP) originating from a reinsurer is received, either directly or through a broker or other intermediary, by the broker in response to an RFFQ coverage proposal, the broker can enter information concerning the FQCP into the coverage data entry table 1200, including: selecting 'Following Quote' as the proposal type 1222; linking information concerning the FQCP to information concerning the RFFQ coverage proposal to which the FQCP responds; specifying the reinsurer providing the FQCP; and entering the risk percentage offered in the FQCP. The broker will not need to re-enter the coverage layer limit, layer retention, or premium per unit of risk percentage for the FQCP, since the FQCP would be auto-assigned the same coverage layer limit, layer retention, and premium per unit of risk percentage as the RFFQ coverage proposal to which the FQCP responds. Once the broker enters the relevant information concerning an FQCP into the coverage data entry table 1200, and reviews and verifies the accuracy of that information, the broker can click the 'Update Coverages' button on the coverage data entry table 1200 (or generate other user actions to submit the information), which will provide the data to create a following quote coverage frame object representing an FQCP whose information is entered in the coverage data entry table 1200. When the broker submits that information, the FQCP will be visually represented as a following quote coverage frame object, and the following quote coverage frame object will be displayed in its correct vertical position within the palette 330 of the visual workspace 300.

Once the broker receives and enters the relevant information concerning a sufficient number of FQCPs, responsive to a particular RFFQ coverage proposal, to warrant further analysis, the broker can review and compare those FQCPs by positioning the RFFQ coverage frame object representing the RFFQ coverage proposal in the tower attachment area 320; clicking on the RFFQ coverage frame object that represents the RFFQ coverage proposal in the tower attachment area 320; clicking on a 'Subscription' control 318 in the command mode area 313; and clicking on a 'Sub. Tower' control 1113 in context sensitive control area 317 (or by generating other user actions to select the RFFQ coverage frame object in the tower attachment area 320 that represents the particular RFFQ coverage proposal and to focus upon the selected RFFQ coverage frame object and the FQCPs responsive to that particular RFFQ coverage proposal). These actions will result in a re-scaled, nested area being displayed in the visual workspace 300, including a re-scaled, nested tower attachment area, surplus area, and palette, all of whose scaling would reflect the coverage layer limit, layer retention, and risk percentage of the RFLQ coverage proposal associated with the accepted LQCP associated with the RFFQ coverage proposal represented by the RFFQ coverage frame object that is selected. A subscription window or popup having both a subscription canvas and subscription palette, as described in Use Case #3, can be used for the re-scaled, nested area. FIG. 16B-16C show the left and right sides of a subscription window or popup, illustrating a subscription canvas 1316, shown in an unfilled state in FIG. 14B, and a subscription palette 1619. The applicable accepted lead quote coverage frame object will be displayed in the subscription tower attachment area within the subscription canvas 1316. Each following quote coverage frame object representing a FQCP whose information is entered in the coverage data entry table 1200 and linked to information concerning that particular RFFQ coverage proposal will be displayed within the subscription palette 1619 of the re-scaled, nested subscription area.

The broker can click on the following quote coverage frame object representing each FQCP to review and compare key coverage metrics, such as carrier credit rating or carrier risk percentage (for example, in the subscription palette object information panel 1689 in the nested subscription area). Using this detailed information, the broker can carefully weigh the carrier credit rating and carrier risk percentage for each FQCP before selecting any FQCP for acceptance.

Once the broker selects one or more FQCPs to accept, the broker can click on each following quote coverage frame object representing a FQCP to be accepted, move each selected following quote coverage frame object from the subscription palette 1619 to the subscription tower attachment area within the subscription canvas 1316 by clicking on a selected following quote coverage frame object again (or by generating other user actions to move the selected following quote coverage frame object to the subscription tower attachment area within the subscription canvas 1316). When all and only the following quote coverage frame objects representing the FQCPs to be accepted have been moved into the subscription tower attachment area within the subscription canvas 1316, the broker can click a 'Submit' button, which changes the proposal status from 'Pending' to 'Accepted' for the selected and moved following quote coverage frame objects; and closes the re-scaled, nested subscription area of the visual workspace 300. The broker can also select FQCPs to accept by generating alternative user actions to select one or more following quote coverage frame objects. In addition, the broker can select FQCPs for acceptance by changing the proposal status 1234 for the coverage proposals represented by the selected and moved coverage frame objects from 'Pending' to 'Accepted in the coverage data entry table 1200, then reviewing and verifying the accuracy of that changed information, and submitting the changed information in the coverage data entry table 1200.

After a FQCP has been chosen and its status changed to 'Accepted,' if the applicable re-scaled, nested subscription area is displayed in the visual workspace 300, the following quote coverage frame object representing that accepted FQCP will be displayed in the subscription tower attachment area of the applicable re-scaled, nested subscription area. In addition, after a FQCP has been accepted, the following quote coverage frame object representing that FQCP will typically (subject to over-subscription limitations) be displayed within the applicable RFLQ coverage frame object in the tower attachment area 320, and if the applicable RFLQ coverage frame object is selected and moved (for example, within the tower attachment area 320, or between the tower attachment area 320 and either the surplus area 328 or the palette 330), the following quote coverage frame object representing that FQCP will typically (subject to over-subscription limitations) be moved with the applicable RFLQ coverage frame object as a single unit.

Beginning with the creation of the RFLQ coverage proposal, the process described above would be repeated for each proposed treaty component of the proposed reinsurance program.

Use Case #6: Verticalised Placement with Subscription Coverages for Casualty Facultative Reinsurance Placement The ceded reinsurance department of an insurance carrier retains a reinsurance broker to place facultative reinsurance coverage for a USD 10,000,000 per occurrence limit, 100% share, USD 1,000,000 retention casualty insurance policy written by the carrier. Since it appears to be unlikely that any reinsurer would be willing to write this entire risk, the reinsurance broker plans to implement a verticalised placement for the facultative RTBP, but the broker also expects to access London market capacity that would typically be provided on a subscription coverage basis.

The broker can proceed using the methods previously described in Use Case #4 "Verticalised Placement for Casualty Facultative Reinsurance Placement" (see above), except that the broker might also include one or more subscription coverages within the placement by adding corresponding RFLQ coverage proposals in the coverage data entry table 1200 or directly to the tower attachment area 320 of the visual workspace 300 using the methods previously described in Use Case #5 "Subscription Placement for Property Catastrophe Treaty Reinsurance Program" (see above). In this way, the broker can flexibly process RFQ coverage proposals and RFLQ coverage proposals within the same placement.

Use Case #7: Integration of Insurance-Linked Securities (ILS) into Property Catastrophe Reinsurance Program The ceded reinsurance department for the small insurance carrier described in Use Case #5: "Subscription Placement for Property Catastrophe Treaty Reinsurance Program" (see above) needs to renew its annual property catastrophe ("CAT") treaty reinsurance program, and it has become increasingly interested in the use of insurance-linked securities (ILS) and other capital market alternatives to traditional reinsurance. To study these options, the insurance carrier retains a reinsurance broker that possesses traditional reinsurance placement skills, as well as expertise in structuring these newer capital market transactions.

After modeling the risk exposures for the carrier's growing book of business, the carrier and broker agree that the carrier will require greater protection from low-frequency, high-severity natural catastrophes in order to maintain its current credit rating. As a result, the carrier and the broker agree to modify the current year's treaty reinsurance program by reducing the exhaustion point for the quota share treaty ('1st Treaty') to USD 75,000,000 per occurrence, and adding a proposed new USD 75,000,000 excess treaty layer ('4th Treaty') at the upper end of the carrier's proposed new reinsurance tower. Based on these changes, the property CAT program will potentially include the following four proposed treaties:

1st Treaty— 20% Quota Share Treaty for whole account up to USD 75,000,000 per occurrence
2nd Treaty—Excess Treaty specified as '80% p/o USD 40,000,000 x/s 10,000,000 per occurrence'
3rd Treaty—Excess Treaty specified as '80% p/o USD 25,000,000 x/s 50,000,000 per occurrence'
4th Treaty—Excess Treaty specified as '100% p/o USD 75,000,000 x/s 75,000,000 per occurrence'

After the carrier and the broker have decided upon this new proposed structure for the carrier's proposed new reinsurance, the broker proceeds with the placement to the point of acceptance of the first three proposed coverage layers of the proposed new reinsurance program using the methods previously described in Use Case #5 "Subscription Placement for Property Catastrophe Treaty Reinsurance Program" (see above). Since the broker and the carrier wish to investigate the possibility of using a capital market alternative to replace the 4th Treaty, the broker proceeds with obtaining quote coverage proposals for the fourth proposed coverage layer of the proposed new reinsurance program using the methods previously described in Use Case #5 (see above). The broker and carrier will reserve judgment on the need for the 4th Treaty pending the outcome of their capital market initiatives. The broker and the carrier will decide later whether to proceed with the placement to the point of acceptance with the 4th Treaty or whether to proceed with the placement to the point of acceptance with a capital market alternative to traditional reinsurance.

To test the availability and affordability of capital market capacity, the carrier and broker further agree that the 4th Treaty layer will be concurrently packaged for possible transfer to the capital markets using one of the following alternative risk transfer instruments: (1) catastrophe bond note; or (2) industry loss warranty (ILW).

To implement a potential catastrophe bond note transaction, the carrier and broker form a new, Bermuda-domiciled special purpose insurer (SPI) that will issue a USD 75,000,000 series of catastrophe bond notes for sale as securities to qualified capital market investors, thereby providing a source of fully-collateralized reinsurance protection to the carrier. To mitigate the carrier's basis risk (i.e., the risk that any actual loss-related payout would differ substantially from the modeled payout), the catastrophe bond notes will include an indemnity-based trigger tied directly to the carrier's actual losses, and their terms will provide protection on a per-occurrence basis for natural catastrophes such as windstorms and earthquakes. In this way, the single tranche of catastrophe bond notes to be offered will be designed to cover the USD 75,000,000 layer, 100% share of the carrier's proposed reinsurance tower extending from a USD 75,000,000 attachment point upwards to a USD 150,000,000 exhaustion point.

The broker will concurrently test the market for industry loss warranties (ILWs), which are structured as either reinsurance or derivative contracts providing the ILW buyer with coverage protection based on the total insurance industry loss arising from a defined catastrophe. In this case, the broker and carrier are seeking to purchase USD 75,000,000 of ILW limit triggered by a single U.S.-based windstorm, earthquake or other natural catastrophe causing total insurance industry losses exceeding USD 10,000,000,000 per occurrence. To identify a suitable industry loss trigger, the broker has modeled the carrier's catastrophe exposures and compared the carrier's estimated catastrophe losses with catastrophe losses potentially experienced across the entire insurance industry. Based upon this modeling, the broker and the carrier have concluded that the USD 10,000,000,000 industry loss trigger would correspond to the planned USD 75,000,000 attachment point in the carrier's proposed reinsurance tower. The broker and the carrier recognize that if the carrier purchases an ILW, the carrier will be assuming basis risk, since the actual performance of the ILW following a catastrophe may differ from the projected performance of the ILW, thereby resulting in a payout that triggers at an actual attachment point above or below the planned USD 75,000,000 attachment point. In this case, the broker and the carrier would also be seeking to structure the ILW as reinsurance, and, as a result, in addition to the industry loss trigger described above, there is an additional indemnity trigger that is part of the ILW transaction. In this case, the broker and the carrier regard the additional indemnity trigger as being de minimis relative to the planned USD 75,000,000 attachment point. While the broker and the carrier recognize that representational uncertainties exist, including representational uncertainties arising from the basis risk and the additional indemnity trigger risk, to evaluate the ILW in relation to other coverage options, the broker and the carrier have decided to represent the benefits of the proposed reinsurance contract to the carrier as the ILW buyer as a '100% p/o USD 75,000,000 x/s 75,000,000 per occurrence' simulated ILW excess layer coverage proposal.

The broker initially enters USD 150,000,000 as the layer limit 506 for the RTBP in the tower data entry table 500 to enable correct scaling of the visual workspace 300 based on the expanded upward scope of the proposed treaty reinsurance program. The broker then follows the methods outlined in Use Case #5 (see above) to create a subscription coverage frame object in the visual workspace 300 for each subscription-based treaty coverage potentially included in the proposed treaty reinsurance program, including the 4th Treaty layer, which will be compared with the proposed USD 75,000,000 series of catastrophe bond notes and the proposed USD 75,000,000 of ILW. Following the methods outlined in Use Case #5 (see above), the broker would proceed with the placement to the point of acceptance of the first three proposed coverage layers of the proposed new reinsurance program and would proceed to the point of obtaining LQCPs for the fourth proposed coverage layer of the proposed new reinsurance program. The broker would subsequently utilize this coverage proposal information to compare the carrier's coverage options in the traditional reinsurance marketplace with its capital market alternatives.

Next, the broker would enter transaction information needed to evaluate the catastrophe bond note alternative in relation to the carrier's other reinsurance options. In this case, qualified capital market investors would pay USD 75,000,000 for the single tranche of catastrophe bond notes issued by the Bermuda-based SPI. Backed by this USD 75,000,000 in investor funding, the SPI would issue a reinsurance policy to the carrier providing protection for the excess layer 'USD 75,000,000 x/s 75,000,000 per occurrence,' 100% share. The SPI can expect to maintain a superior credit rating since the USD 75,000,000 reinsurance limit specified by the SPI reinsurance policy is fully collateralized with the investor funds retained by the SPI.

Although numerous institutional investors would purchase the catastrophe bond notes funding the SPI, the SPI itself would assume the whole excess layer 'USD 75,000,000 x/s 75,000,000 per occurrence,' 100% share, specified in the reinsurance policy to be issued to the carrier. As a result, the broker can treat this coverage proposal as a simple 100% coverage proposal, rather than as a subscription coverage proposal.

To record the SPI excess layer coverage proposal associated with the single tranche of catastrophe bond notes, the broker would use the methods previously described in Use Case #1 (see above) to create a coverage frame object in the visual workspace 300 for a quote coverage proposal corresponding to the SPI excess layer coverage proposal, except that it would be necessary for the broker to enter additional information. (Since the SPI excess layer coverage proposal would not have been a response to an RFCP, it would be necessary for the broker to specify the identity of the carrier, and it would be necessary to enter a different type of pricing information, as if it were a premium.) The broker will obtain pricing for the SPI excess layer coverage proposal to enter as a premium amount not from a reinsurance carrier, but rather based on the pricing guidance used to set the coupon rate for the catastrophe bond notes to be issued by the SPI. The broker and carrier will perform catastrophe modeling to calculate the exceedance probabilities for the coverage attachment point and exhaustion point, and expected losses for the coverage period. These modeling results are then converted to a percentage-based coupon price guide range. With this coupon pricing guidance in hand, the broker would enter information concerning the SPI excess layer coverage proposal into the coverage data entry table 1200, including: selecting the 'Quote' proposal type; entering the coverage layer limit, layer retention, and risk percentage terms; specifying the SPI itself as if it were a reinsurance carrier providing the quote coverage proposal; and entering the premium amount derived from the estimated bond coupon rates as if it were a reinsurance premium amount quoted by a reinsurance carrier. The broker would need to exercise caution in reviewing the pricing for the SPI option since the actual premium to be paid to SPI would be determined only after the catastrophe bond notes were sold to the capital market investors. Once the broker had entered all of the relevant information concerning the SPI excess layer coverage proposal into the coverage data entry table 1200, reviewed that information, and verified the accuracy of that information, the broker would click the 'Update Coverages' button on the coverage data entry table 1200 (or generate other user actions to submit the information that had been entered in the coverage data entry table 1200), which would provide the data to create a coverage frame object representing the SPI excess layer coverage proposal whose information the broker had entered in the coverage data entry table 1200.

Once the broker had submitted the information in the coverage data entry table 1200, the SPI excess layer coverage proposal would be visually represented as a coverage frame object, and the coverage frame object would be displayed in its correct vertical position within the palette 330 of the visual workspace 300. Once the coverage frame object representing the SPI excess layer coverage proposal had been created, displayed in its correct vertical position within the palette 330 of the visual workspace 300, and selected, the broker would view detailed information concerning the SPI excess layer coverage proposal and could edit the terms of the SPI excess layer coverage proposal. (While the coverage frame object would have been based on the SPI excess layer coverage proposal, if the broker wished to do so, the broker could edit the terms of the coverage frame object using the methods previously described in Use Case #1 (see above), except that in this case the broker would be editing the terms of the SPI excess layer coverage proposal represented by the coverage frame object, rather than editing the terms of a RFCP represented by a selected coverage frame object.) Following review, the broker would select the coverage frame object that represents the SPI excess layer coverage proposal and would move the selected coverage frame object to the tower attachment area 320 of the visual workspace 300 for further processing using the methods previously described in Use Case #1 (see above).

The broker would also enter data needed to evaluate the '100% p/o USD 75,000,000 x/s 75,000,000 per occurrence' simulated ILW excess layer coverage proposal described above in relation to other coverage options. Since the broker would be seeking to place the whole ILW with a single market, the broker would use the methods previously described in Use Case #1 (see above) to create a quote coverage frame object in the visual workspace 300, except that it would be necessary for the broker to enter additional information. (Since the simulated ILW excess layer coverage proposal would not have been a response to an RFCP, it would be necessary for the broker to specify the identity of the carrier.) The broker would enter information concerning the simulated ILW excess layer coverage proposal into the coverage data entry table 1200, including: selecting the 'Quote' proposal type; entering coverage layer limit, layer retention, and risk percentage values that would reflect the decisions the broker and the carrier had made previously concerning the representation of the simulated ILW excess layer coverage proposal tied to the USD 10,000,000,000 industry loss trigger and the indemnity trigger described above (which coverage layer limit, layer retention, and risk percentage values would be USD 75,000,000, USD 75,000,000, and 100%, respectively); specifying the ILW issuer itself or some other related entity as if it were a reinsurance carrier providing the simulated ILW excess layer coverage proposal; and entering the premium amount. In this case, since the broker and the carrier would also be seeking to structure the ILW as reinsurance, as described above, the broker should be able to enter the premium amount from the ILW. Once the broker had entered the relevant information concerning the simulated ILW excess layer coverage proposal into the coverage data entry table 1200, reviewed and verified the accuracy of that information, the broker would click the 'Update Coverages' button on the coverage data entry table 1200 (or generate other user actions to submit the information that has been entered in the coverage data entry table 1200), which would provide the data to create a quote coverage frame object representing the simulated ILW excess layer coverage proposal whose information the broker had entered in the coverage data entry table 1200.

Once the broker had submitted the information in the coverage data entry table 1200, the simulated ILW excess layer coverage proposal would be visually represented as a quote coverage frame object, and the quote coverage frame object would be displayed in its correct vertical position within the palette 330 of the visual workspace 300. Once the quote coverage frame object representing the simulated ILW excess layer coverage proposal had been created, displayed in its correct vertical position within the palette 330, and selected, the broker would view detailed information concerning the simulated ILW excess layer coverage proposal and could edit the terms of the simulated ILW excess layer coverage proposal. While the coverage frame object would have been based on the simulated ILW excess layer coverage proposal, if the broker wished to do so, the broker could edit the terms of the coverage frame object using the methods previously described in Use Case #1 (see above), except that in this case the broker would be editing the terms of the simulated ILW excess layer coverage proposal represented by the coverage frame object, rather than editing the terms of a RFCP represented by a selected coverage frame object. Following review, the broker would select the quote coverage frame object that represents the simulated ILW excess layer coverage proposal, and would move the selected quote coverage frame object to the tower attachment area 320 for further processing using the methods previously described in Use Case #1 (see above).

Once both the quote coverage frame object that represents the SPI excess layer coverage proposal and the quote coverage frame object that represents the simulated ILW excess layer coverage proposal had been created and displayed in their respective correct vertical positions within the tower attachment area 320 of the visual workspace 300, the broker could alternately select and view detailed information concerning the SPI excess layer coverage proposal, on the one hand, and the simulated ILW excess layer coverage proposal, on the other hand, by using the methods previously described in Use Case #4 "Verticalised Placement for Casualty Facultative Reinsurance Placement" (see above). By doing so, the broker could review and compare key coverage metrics, such as carrier credit rating and coverage rate-on-line, for both capital market alternative placement options. While the quote coverage frame object that represents the SPI excess layer coverage proposal and the quote coverage frame object that represents the simulated ILW excess layer coverage proposal would both occupy the same region in the tower attachment area 320 when moved completely into the tower attachment area 320, the broker could alternately select and move the two coverage frame objects between the tower attachment area 320 and palette 330 to study the available options using the methods previously described in Use Case #1 (see above). Provided that the broker had proceeded, using the methods previously described in Use Case #5 "Subscription Placement for Property Catastrophe Treaty Reinsurance Program" (see above), with the placement of the 4th Treaty of the reinsurance program to the point of obtaining lead quotes and following quotes, and provided that the broker had reached a point at which one or more LQCPs and one or more following quote coverage proposals (FQCPs) had been obtained for the RFLQ coverage proposal corresponding to the 4th Treaty, the broker could also review and compare key coverage metrics, such as carrier credit rating and coverage rate-on-line, for some or all of those LQCPs and FQCPs in comparison with the SPI excess layer coverage proposal and the simulated ILW excess layer coverage proposal. The broker could, for example, sequentially select lead quote coverage frame objects representing those LQCPs, following quote coverage frame objects representing those FQCPs, the quote coverage frame object representing the SPI excess layer coverage proposal, and the quote coverage frame object representing the simulated ILW excess layer coverage proposal, to view detailed information concerning the coverage proposals represented by those coverage frame objects, respectively, to study the available options using the methods previously described in Use Case #1 (see above).

If the broker and carrier were to elect to proceed with the traditional reinsurance option, the broker would proceed to complete the subscription coverage corresponding to the 4th Treaty to the point of acceptance, using the methods previously described in Use Case #5 (see above). If the broker and carrier instead were to select the catastrophe bond note option, the broker would bind the SPI excess layer coverage proposal, using the methods previously described in Use Case #1 (see above), following the issuance and sale of the catastrophe bond notes to interested investors. Finally, if the broker and the carrier were instead to prefer the simulated ILW excess layer coverage proposal, the broker would bind the simulated ILW excess layer coverage proposal, using the methods previously described in Use Case #1 (see above).

Computer System

FIG. 17 is a block diagram of an example computer system 1700. FIG. 17 is a block diagram of an example computer system, according to one implementation. The processor can be an ASIC or RISC processor. It can be an FPGA or other logic or gate array. It can include graphic processing unit (GPU) resources. Computer system 1710 typically includes at least one processor 1772 that communicates with a number of peripheral devices via bus subsystem 1750. These peripheral devices may include a storage subsystem 1726 including, for example, memory devices and a file storage subsystem, user interface input devices 1738, user interface output devices 1778, and a network interface subsystem 1776. The input and output devices allow user interaction with computer system 1710. Network interface subsystem 1776 provides an interface to outside networks, including an interface to corresponding interface devices in other computer systems.

User interface input devices 1738 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1710.

User interface output devices 1778 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1710 to the user or to another machine or computer system.

Storage subsystem 1726 stores programming and data constructs that provide the functionality of some or all of the modules and methods described herein. These software modules are generally executed by processor 1772 alone or in combination with other processors.

Memory subsystem 1722 used in the storage subsystem can include a number of memories including a main random access memory (RAM) 1734 for storage of instructions and data during program execution and a read only memory (ROM) 1732 in which fixed instructions are stored. A file storage subsystem 1736 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1736 in the storage subsystem 1726, or in other machines accessible by the processor.

In some implementations, network(s) can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Bus subsystem 1750 provides a mechanism for letting the various components and subsystems of computer system 1710 communicate with each other as intended. Although bus subsystem 1750 is shown schematically as a single bus, alternative implementations of the bus subsystem may use multiple busses.

Computer system 1710 can be of varying types including a workstation, server, computing cluster, blade server, server farm, or any other data processing system or computing device. Due to the ever-changing nature of computers and networks, the description of computer system 1710 depicted in FIG. 17 is intended only as one example. Many other configurations of computer system 1710 are possible having more or fewer components than the computer system depicted in FIG. 17.

Particular Implementations

One implementation of the disclosed technology includes a method of processing and displaying database objects to build a plan tower structure, including providing a canvas structure that comprises the tower attachment area and a surplus area, wherein the tower attachment area is bounded by an upper tower boundary, a lower tower boundary, and a tower share boundary in a range of 5 to 100 percent. The disclosed method further includes providing a plurality of coverage frame objects, wherein each of the coverage frame objects represents a request for quote, a quote available to be bound, or other type of a coverage proposal concerning an insurance policy or risk transfer instrument; has an extent defined by an upper frame boundary, a lower frame boundary and a frame share boundary; and is selectably positioned on the canvas structure in one of a group of positions consisting of within the tower attachment area, straddling the tower share boundary, and in the surplus area outside the tower attachment area. Further, this method includes receiving data representing assignment of a first coverage frame object to the tower attachment area and assigning the first coverage frame object to a first position within the tower attachment area; receiving data representing assignment of a second coverage frame object to the surplus area and assigning the second coverage frame object to the surplus area; and transmitting data for display representing at least the canvas structure including the tower attachment area; the first coverage frame object automatically positioned and scaled within the tower attachment area based on the relationship of the upper frame boundary and the lower frame boundary to the upper tower boundary and the lower tower boundary; and the second coverage frame object positioned outside the tower attachment area.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified.

The first coverage frame object can be positioned within the tower attachment area relative to the tower share boundary responsive to data representing a user selection of a share position of the first coverage frame object. In one implementation, the method includes at least one coverage frame object adapted to contain a plurality of other coverage frame objects. The method disclosed further includes differentiating between a lead quote and following quotes that follow the lead quote, with one lead quote coverage frame object and a plurality of following quote coverage frame objects contained within a same coverage frame object serving as a container. Further, at least one coverage frame object is a quote and further includes a premium for binding the insurance policy or risk transfer instrument.

The method can also include receiving data representing user selection of a displayed coverage frame object; and transmitting for display information for a selected coverage frame object. The information includes proposal type; coverage layer limit, layer retention and risk percentage; market for the corresponding coverage proposal; carrier credit rating; coverage premium; and coverage rate-on-line (C-ROL). The method disclosed further includes transmitting for display information that aggregates the coverage frame objects assigned to the plan tower structure, the information that aggregates the coverage frame objects includes a count of the coverage frame objects, total premium quoted and bound, buyer net retained line (BNRL) and tower rate-on-line (T-ROL).

The method can further include receiving data representing a user moving the second coverage frame object into the tower attachment area; updating the second coverage frame object to assign it to the tower attachment area; and updating and transmitting for display the information that aggregates the coverage frame objects assigned to the tower attachment area. The disclosed method can further include providing a palette structure, outside the tower attachment area and distinct from the canvas structure; wherein each of the coverage frame objects can further be selectably positioned on the palette structure instead of the canvas structure; transmitting data for display that further includes data representing the palette structure and a third coverage frame object positioned within the palette structure.

A feature can include receiving data representing assignment of a third coverage frame object to the straddle position, including data indicating what share of the third coverage frame object is within the tower attachment area; and transmitting data for display that further includes data representing the third coverage frame object: automatically positioned within the tower attachment area based on the relationship of the upper frame boundary and the lower frame boundary to the upper tower boundary and the lower tower boundary; and positioned partially within the tower attachment area and partially outside the tower attachment area, as assigned.

Another feature can include transmitting data for display that suggests subdivision of the third coverage frame object at the tower share boundary; receiving data representing user input designating subdivision of the third coverage frame object; and creating a plurality of new coverage frame objects contained within the third coverage frame object, wherein the new coverage frame objects subdivide the third coverage frame object and assigning one or more of the new coverage frame objects that are within the tower attachment area to the tower attachment area.

Some implementations include receiving data representing user input positioning of a fourth coverage frame object in a fourth position, wherein the fourth position is in the tower attachment area or straddling the tower share boundary and the fourth coverage frame object overlaps the position of the first coverage frame object. The disclosed method includes generating data for display that suggests subdivision of the first and/or fourth coverage frame object at lines defining the overlap in positions; receiving data representing user input designating subdivision of the first or fourth coverage frame object, retention of one or more designated parts of the subdivided coverage frame object in the tower attachment area, and transfer of one or more overlapped and undesignated parts out of the tower attachment area. The method further includes creating a plurality of new coverage frame objects contained within the designated coverage frame object, wherein the new coverage frame objects subdivide the designated coverage frame object and assigning one or more of the new coverage frame objects as designated to the tower attachment area; and transmitting data for display representing the subdivision of the designated coverage frame object.

The disclosed technology includes, in the transmitted data for display, data representing one or more unused parts of the designated coverage frame object in a ghosted frame that represents a whole quote. The method further includes generating a new request for quote from at least some of the new coverage frame objects within the subdivided designated coverage frame and transmitting the new request for quote to at least a party that offered the quote in the fourth coverage frame object. The method further includes receiving data representing a quote responsive to a request for quote; linking a fifth coverage frame object that represents the quote to a fourth coverage frame object that represents the request for quote; and transmitting data for display that visually represents the fifth coverage frame object as coincident in position with and responsive to the fourth coverage frame object.

In another implementation, a method is disclosed of interactively processing database objects to build at least one composite coverage structure, including accessing at least first and second policy layer objects, wherein each policy layer object includes attachment control data, wherein the attachment control data is selected from a group that includes at least attached and unattached. For this method, request-proposal type data is also accessed, wherein the request-proposal type data is selected from a group of types that includes at least a request for quote, a request for lead quote, a quote, a lead quote and a following quote; object rectangle data, and includes an object limit, an object retention, an object premium, and an object percentage. The first policy layer object of the disclosed method includes the attachment control data set to attached, and the second policy layer object includes the attachment control data set to unattached. This method further includes accessing a tower attached pane and a tower unattached pane, wherein each tower pane includes at least a tower first limit, a tower retention, and a tower percentage scale. Further, the first policy layer object is assigned to the tower attached pane and the second policy layer object is assigned to the tower unattached pane. The tower attached pane (risk-attached) also can include a second palette, tower attached pane and a second tower unattached pane as parts of a pane; also referred to as an object selection area.

This further implementation can include most any combination of features described throughout this disclosure. In the interest of conciseness, the self-apparent permutations of features combinable in a method system are not exhaustively enumerated.

The disclosed method of interactively processing database objects to build at least one composite coverage structure further includes receiving data representing a third policy layer object including the request-proposal type data set to quote and the object rectangle data; assigning the third policy layer object to one of the tower panes based on the attachment control data or a default; calculating attached summary data based on policy layer objects assigned to the tower attached pane, wherein the attached summary data includes: a count of attached policy layer objects; total premium quoted and bound; buyer net retained line (BNRL); and tower rate-on-line (T-ROL). Further, this disclosed method includes determining within the tower attached pane a first position of the first policy layer object based on the layer rectangle data; determining within the tower unattached pane a second position of the second policy layer object based on the layer rectangle data; determining a third position of the third policy layer object within the assigned tower pane based on the layer rectangle data, wherein the third position is snapped to the second position; generating data for display of the tower attached pane, of the tower summary data and of the tower unattached pane, wherein the data for display of each of the tower panes includes graphic representations of respective policy layer objects; and transmitting to a user workstation the data for display.

This disclosed method further includes nesting by accessing a tenth layer frame object, wherein each layer frame object is a container that contains at least one policy layer object and/or that nests another layer frame object and includes the attachment control data; wherein the first policy layer object is contained within the tenth layer frame object and the first policy layer object inherits the attachment control data from the containing layer frame object; determining within the tower attached pane a tenth position of the tenth layer frame object; wherein the first position of the first policy layer object is within the tenth position of the tenth layer frame object.

The disclosed method includes nesting lead and following requests for quotes and quotes, accessing a tenth layer frame object, wherein each layer frame object is a container that contains at least one policy layer object and/or that nests another layer frame object and includes the attachment control data; wherein the tenth layer frame object has attachment control data set to attached; wherein the first policy layer object includes the request-proposal type data set to lead quote, the first policy layer object is contained within the tenth layer frame object and the first policy layer object inherits the attachment control data from the containing layer frame object; receiving data representing a fourth policy layer object that includes the request-proposal type data set to following quote and that the fourth policy layer object is contained within the tenth layer frame object with the first policy layer object; determining within the tower attached pane a tenth position of the tenth layer frame object;

wherein the first position of the first and fourth policy layer objects are within the tenth position of the tenth layer frame object.

In some implementations the method disclosed includes multiple layers in panes wherein the tower attached pane further includes a tower second limit over the tower first limit, thereby defining a plurality of adjoining policy layers; each policy layer object further includes a layer identifier that assigns the policy layer to one in the plurality of policy layers; and the data for display further includes the plurality of policy layers.

The disclosed method can include subdividing a layer object: receiving data representing user input positioning a layer rectangle for a fourth policy layer object in the tower attached pane with an overlap of the layer rectangle for the first policy layer object; generating data for display to contain parts of a suggested subdivision of the first and/or fourth policy layer object determined from the overlap; receiving user input designating subdivision of the first or fourth policy layer object, retention of designated parts of the subdivided policy layer object in the tower attached pane, and transfer of undesignated parts to the tower unattached pane. This disclosed method further includes creating an eleventh layer frame object to contain parts of the subdivided policy layer object, wherein the eleventh layer frame object has the attachment control data set to unattached; creating a plurality of policy layer sub-objects responsive to the user input designating the subdivision, wherein the sub-objects inherit data from the subdivided policy object as modified by the subdivision; wherein the eleventh layer frame object contains the policy layer sub-objects.

One disclosed method of assisting human understanding or placement of a complex program of multiple insurance policies or other risk transfer instruments that includes multiple carriers and multiple layers includes providing a visual workspace that includes a rectangular tower attachment area whose boundaries represent extents of limit, retention, and risk percentage of a risk to be placed ("RTBP"). This method also includes receiving user-supplied data for coverage proposals, and representing coverage proposals as proposal rectangles; receiving user actions selecting some of the proposal rectangles to locate in the tower attachment area; and locating in the tower attachment area the selected proposal rectangles automatically scaled to limit, retention, and risk percentage, thereby visually building in the tower attachment area a potential composite coverage structure for the RTBP from the proposal rectangles. The method further includes initially locating at least some of the proposal rectangles in an unattached area of the visual workspace, then relocating at least some of the proposal rectangles to the tower attachment area. The disclosed method further includes receiving user actions subdividing a parent proposal rectangle that overlaps with another proposal rectangle or a boundary of the tower attachment area; automatically suggesting horizontal subdivision of the parent proposal rectangle into multiple layers or vertical subdivision (or both) of the parent proposal rectangle into tower attachment and palette or surplus portions; receiving user actions selecting a subdivision of the parent proposal rectangle to include in the potential composite coverage structure and to separate the parent proposal rectangle into two or more child proposal rectangles that are either tower attachment child proposal rectangles in the tower attachment area or remainder child proposal rectangles in the palette. The method disclosed includes automatic subdivision at a tower attachment area boundary, wherein the suggested vertical subdivision coincides with intersection of proposal rectangles with tower attachment area boundaries. The disclosed method further includes automatic subdivision wherein the suggested horizontal or vertical subdivision coincides with intersection of the parent proposal rectangles with another proposal rectangle.

The disclosed method also includes merging: allowing selected adjoining subdivisions to combine if the result is rectangular. The disclosed method further includes ghosting by displaying in the palette a parent proposal rectangle derivative with contrasting visual representation of tower attachment child proposal rectangles that are in the tower attachment area and remainder child proposal rectangles. The method disclosed further includes detecting that all child proposal rectangles of a parent proposal rectangle are located in the tower attachment area and visually indicating exhaustion of the parent proposal rectangle derivative in the palette. Additionally, the disclosed method includes moving in and out of tower attachment area: responsive to receiving user actions selecting a proposal rectangle, and moving the selected proposal rectangle from the tower attachment area into the palette or the surplus area, or moving the selected proposal rectangle from the palette or the surplus area into the tower attachment area.

The method disclosed further includes reference statistics responsive to receiving user actions selecting a proposal rectangle, displaying detailed information concerning the coverage proposal represented by the selected rectangle including the coverage proposal's carrier name, carrier credit rating, and additional information concerning the coverage proposal, including two or more of: limit, retention, risk percentage, premium, type, and coverage rate on line.

A disclosed method includes, responsive to receiving user actions, selecting and producing a matrix from proposal rectangles in the tower attachment area, displaying detailed information concerning each of the coverage proposals represented by each of the proposal rectangles in the tower attachment area in a multiple-row, multiple-column, sortable matrix, including two or more of each coverage proposal's carrier name, carrier credit rating, limit, retention, risk percentage, premium, and type.

For non-straddle dynamic statistics, the method disclosed further includes, responsive to relocation of proposal rectangles into and out of the tower attachment area, updating aggregate statistics regarding proposal rectangles completely in the tower attachment area, including total tower attachment area premium, calculated as the sum of the adjusted premiums for each coverage proposal corresponding to each proposal rectangle in the tower attachment area; buyer net retained line ("BNRL"), calculated as (unoccupied portion tower attachment area); and tower attachment area rate on line. The method disclosed also includes, responsive to receiving user actions, selecting a proposal rectangle, and moving the selected proposal rectangle from the tower attachment area into the palette or the surplus area, or moving the selected proposal rectangle from the palette or the surplus area into the tower attachment area. The disclosed method further includes in the aggregate statistics only the proportionate amount of any coverage proposal characteristic corresponding to that portion of a proposal rectangle that is partially within the tower attachment area. Further, the method includes in the aggregate statistics the entire amount of any coverage proposal characteristic corresponding to a proposal rectangle that is partially within the tower attachment area.

In some implementations, a method is disclosed for quotes and RFQ rectangle types for accommodating variant proposal rectangle types, including at least: a first variant, request for quote frame rectangle, a proposal rectangle created responsive to user actions to request a coverage proposal with user-requested extents of limit, retention, and risk percentage, and a second variant, quote proposal rectangle, a proposal rectangle corresponding to a single coverage proposal from a carrier, tracking the variant types of the proposal rectangles, and differentiating handling of the proposal rectangles responsive to the variant types. The disclosed method includes visually differentiating the proposal rectangles responsive to the variant types, including at least visually differentiating a request for quote frame rectangle using one color, a quote proposal rectangle based on the corresponding coverage proposal's carrier credit rating, comprising using different colors to represent different credit ratings.

The disclosed method further includes RFQ creation and transmission: receiving user actions creating a request for quote frame rectangle in the tower attachment area or in the palette, selecting a carrier or broker to which a coverage request for quote corresponding to the created request for quote frame rectangle will be sent, generating the coverage request for quote, and sending the coverage request for quote to the selected carrier or broker. Additionally the method disclosed includes receiving user actions expanding or contracting the created request for quote frame rectangle, or changing the position of the created request for quote frame rectangle relative to a risk percentage origin indicator. In some implementations, the method further includes automatically expanding the created request for quote frame rectangle to fill the tower attachment area or an unoccupied rectangular area of the tower attachment area that is indicated by the user positioning a cursor at a first corner of the indicated area, submitting the position, including by giving a return or mouse-click command, positioning a cursor at a second corner of the indicated area diagonal to the first corner, submitting the position, and automatically responsively expanding the created request for quote frame rectangle to fill the rectangle defined by the first corner and the second corner; the user positioning a cursor at or near the center of the indicated area, submitting the position, including by giving a return or mouse-click command, and automatically responsively expanding the created request for quote frame rectangle until bounded, completely or partially, by a tower attachment area boundary or by a complete or partial edge of another proposal rectangle; or the user positioning a cursor at a first point within the indicated area, submitting the position, including by giving a return or mouse-click command, positioning a cursor at a second point of the indicated area diagonal to the first point, submitting the position, including by giving a return or mouse-click command, and automatically responsively expanding the created request for quote frame rectangle until bounded, completely or partially, by a tower attachment area boundary or by a complete or partial edge of another proposal rectangle.

In one implementation, the method disclosed includes accommodating additional variant proposal rectangle types for a subscription frame coverage proposal. The disclosed method includes at least a third variant, subscription frame proposal rectangle, whose boundaries represent extents of limit, retention, and percentage of a subscription frame coverage proposal potentially being a part of a potential composite coverage structure for the RTBP; and a fourth variant, subscription slice proposal rectangle having a potential constitutive relationship or an actual constitutive relationship with a subscription frame proposal rectangle; whose boundaries represent extents of limit and retention equal to the extents of limit and retention of the potentially or actually constitutively related subscription frame proposal rectangle; and whose risk percentage is less than or equal to the risk percentage of the potentially or actually constitutively related subscription frame proposal rectangle. The disclosed method further includes accommodating additional variant subscription slice proposal rectangle types, including at least a fifth variant, lead quote subscription slice proposal rectangle, a subscription slice proposal rectangle whose corresponding coverage proposal, when the lead quote subscription slice proposal has an actual constitutive relationship with the subscription frame proposal rectangle, establishes the premium per unit of risk percentage for any other subscription slice proposal rectangle having an actual constitutive relationship with the subscription frame proposal rectangle; and a sixth variant, following quote subscription slice proposal rectangle, a subscription slice proposal rectangle whose corresponding coverage proposal, when the following quote subscription slice proposal has an actual constitutive relationship with the subscription frame proposal rectangle, has a premium per unit of risk percentage equal to the lead quote subscription slice proposal rectangle having an actual constitutive relationship with the subscription frame proposal rectangle. The method further includes receiving user actions accepting a proposal rectangle in the tower attachment area as an element of the composite coverage structure. The method disclosed also includes providing one or more tables for entry and editing of user-supplied data for the coverage proposals, and the tower attachment area.

The disclosed method further includes relationships between coverage proposals, including receiving user-supplied data for relationships between coverage proposals or between proposal rectangles, tracking the relationships between coverage proposals or between proposal rectangles, and differentiating handling of proposal rectangles responsive to the proposal rectangles' relationships or responsive to the corresponding coverage proposals' relationships, including a constitutive relationship.

In one implementation, a disclosed method of assisting human understanding or placement of a complex program of multiple insurance policies or other risk transfer instruments that includes multiple carriers, multiple layers, and a subscription frame coverage, includes providing a visual workspace that includes a rectangular tower attachment area whose boundaries represent extents of limit, retention, and risk percentage of a risk to be placed ("RTBP"); receiving user-supplied data for coverage proposals, and representing coverage proposals as proposal rectangles. The method disclosed further includes accommodating variant proposal rectangle types for a subscription frame coverage proposal, including at least a first variant, subscription frame proposal rectangle, whose boundaries represent extents of limit, retention, and risk percentage of a subscription frame coverage proposal, and a second variant, subscription element proposal rectangle, having a potential constitutive relationship or an actual constitutive relationship with a subscription frame proposal rectangle, whose boundaries represent extents of limit and retention equal to the extents of limit and retention of the subscription frame coverage proposal corresponding to the potentially or actually constitutively related subscription frame proposal rectangle, and whose risk percentage is less than or equal to the risk percentage of the subscription frame coverage proposal corresponding to the potentially or actually constitutively related subscription frame proposal rectangle. The method also includes receiving user-supplied data for relationships between coverage proposals or between proposal rectangles, tracking the relationships between coverage proposals or between proposal rectangles, and differentiating handling of proposal rectangles responsive to the proposal rectangles' relationships or responsive to the corresponding coverage proposals' relationships; and receiving user actions selecting a subscription frame proposal rectangle to locate in the tower attachment area, or creating a subscription frame proposal rectangle in the tower attachment area; and locating in the tower attachment area the selected subscription frame proposal rectangle or the created subscription frame proposal rectangle automatically scaled to limit, retention, and risk percentage, thereby visually building in the tower attachment area a potential composite coverage structure, including a subscription frame proposal rectangle, for the RTBP from the proposal rectangles.

One implementation of the disclosed method includes accommodating additional variant subscription element proposal rectangle types, including at least a third variant, lead quote subscription element proposal rectangle, a subscription element proposal rectangle whose corresponding coverage proposal, when the lead quote subscription element proposal rectangle has an actual constitutive relationship with the subscription frame proposal rectangle, establishes the premium per unit of risk percentage for any coverage proposal represented by any other subscription element proposal rectangle having an actual constitutive relationship with the subscription frame proposal rectangle. The method further includes a fourth variant, following quote subscription element proposal rectangle, a subscription element proposal rectangle whose corresponding coverage proposal, when the following quote subscription element proposal rectangle has an actual constitutive relationship with the subscription frame proposal rectangle, has a premium per unit of risk percentage equal to that of the coverage proposal represented by the lead quote subscription element proposal rectangle having an actual constitutive relationship with the subscription frame proposal rectangle.

In one implementation the disclosed method includes receiving user actions changing the relationship between a subscription frame proposal rectangle, on the one hand, and a lead quote subscription element proposal rectangle or a following quote subscription element proposal rectangle, on the other hand, including changing from a potential constitutive relationship to an actual constitutive relationship, or from an actual constitutive relationship to a potential constitutive relationship. The method disclosed also includes differentiating handling of proposal rectangles responsive to the proposal rectangles' relationships or responsive to the corresponding coverage proposals' relationships by, responsive to locating in the tower attachment area a selected subscription frame proposal rectangle, visually displaying or visually representing a lead quote subscription element proposal rectangle or a following quote subscription element proposal rectangle having an actual constitutive relationship with the selected subscription frame proposal rectangle or the created subscription frame proposal rectangle in the selected subscription frame proposal rectangle or the created subscription frame proposal rectangle. The method further includes, responsive to receiving user actions selecting a subscription frame proposal rectangle, moving the selected subscription frame proposal rectangle within the tower attachment area.

In one implementation, the method disclosed includes, responsive to receiving user actions selecting a subscription frame proposal rectangle, moving the selected subscription frame proposal rectangle within the tower attachment area. The method further includes differentiating handling of proposal rectangles responsive to the proposal rectangles' relationships or responsive to the corresponding coverage proposals' relationships by, responsive to receiving user actions selecting a subscription frame proposal rectangle and moving the selected subscription frame proposal rectangle within the tower attachment area, moving a lead quote subscription element proposal rectangle or a following quote subscription element proposal rectangle having an actual constitutive relationship with the selected subscription frame proposal rectangle as a single unit. The method disclosed also includes differentiating handling of proposal rectangles responsive to the proposal rectangles' relationships or responsive to the corresponding coverage proposals' relationships by, responsive to receiving user actions selecting a subscription frame proposal rectangle and moving the selected subscription frame proposal rectangle within the tower attachment area, moving a lead quote subscription element proposal rectangle or a following quote subscription element proposal rectangle having an actual constitutive relationship with the selected subscription frame proposal rectangle as a single unit.

The method disclosed further includes, responsive to receiving user actions, selecting a subscription frame proposal rectangle and moving the selected subscription frame proposal rectangle from the risk-attached area into the unattached area or the surplus area, or moving the selected subscription frame proposal rectangle from the unattached area or the surplus area into the risk-attached area. The method also includes differentiating handling of proposal rectangles responsive to the proposal rectangles' relationships or responsive to the corresponding coverage proposals' relationships by, responsive to receiving user actions, selecting a subscription frame proposal rectangle and moving the selected subscription frame proposal rectangle from the risk-attached area into the unattached area or the surplus area, or moving the selected subscription frame proposal rectangle from the unattached area or the surplus area into the risk-attached area: moving a lead quote subscription element proposal rectangle or a following quote subscription element proposal rectangle having an actual constitutive relationship with the selected subscription frame proposal rectangle as a single unit. The disclosed method further includes differentiating handling of proposal rectangles responsive to the proposal rectangles' relationships or responsive to the corresponding coverage proposals' relationships by, responsive to receiving user actions, selecting a subscription frame proposal rectangle and moving the selected subscription frame proposal rectangle from the risk-attached area into the unattached area or the surplus area, or moving the selected subscription frame proposal rectangle from the unattached area or the surplus area into the risk-attached area: moving a lead quote subscription element proposal rectangle or a following quote subscription element proposal rectangle having an actual constitutive relationship with the selected subscription frame proposal rectangle as a single unit.

The method disclosed further includes accommodating additional variant subscription element proposal rectangle types, via at least a fifth variant request for lead quote subscription element proposal rectangle, a subscription element proposal rectangle created responsive to user actions to request a lead quote subscription element; and a sixth variant, request for following quote subscription element proposal rectangle, a subscription element proposal rectangle created responsive to user actions to request a following quote subscription element. An additional disclosed method further includes, by accommodating additional variant subscription element proposal rectangle types, including at least a fifth variant, request for lead quote subscription element proposal rectangle, a subscription element proposal rectangle created responsive to user actions to request a lead quote subscription element, and a sixth variant, request for following quote subscription element proposal rectangle, a subscription element proposal rectangle created responsive to user actions to request a following quote subscription element. The disclosed method includes multiple reference statistics in a sortable matrix, responsive to receiving user actions selecting and producing a matrix from a subscription frame proposal rectangle, displaying detailed information concerning each of the coverage proposals represented by each of the proposal rectangles in the subscription frame proposal rectangle in a multiple-row, multiple-column, sortable matrix, including each coverage proposal's carrier name, carrier credit rating, risk percentage, and type.

One implementation of a disclosed method of assisting human understanding or placement of a complex program of multiple insurance policies or other risk transfer instruments that includes multiple carriers, multiple layers, and multiple levels of insurance coverage includes: providing a visual workspace that includes a rectangular tower attachment area whose boundaries represent extents of limit, retention, and risk percentage of a risk to be placed ("RTBP"); and receiving user-supplied data for coverage proposals, and representing coverage proposals as proposal rectangles accommodating variant proposal rectangle types. This method includes at least a first variant, frame proposal rectangle, whose boundaries represent extents of limit, retention, and risk percentage of a frame coverage proposal, and a second variant, frame element proposal rectangle, having a potential sectional relationship or an actual sectional relationship with a frame proposal rectangle, and whose boundaries represent extents of limit, retention, and risk percentage less than or equal to the extents of limit, retention, and risk percentage of the frame coverage proposal corresponding to the potentially related frame proposal rectangle. The method further includes receiving user-supplied data for relationships between coverage proposals or between proposal rectangles, tracking the relationships between coverage proposals or between proposal rectangles, and differentiating handling of proposal rectangles responsive to the proposal rectangles' relationships or responsive to the corresponding coverage proposals' relationships; receiving user actions changing the relationship between a frame proposal rectangle and frame element proposal rectangle, including changing from a potential sectional relationship to an actual sectional relationship, or from an actual sectional relationship to a potential sectional relationship; responsive to receiving user actions selecting and focusing on a frame proposal rectangle, displaying within the visual workspace a rectangular nested tower attachment area whose boundaries represent extents of limit, retention, and percentage of the frame coverage proposal corresponding to the selected frame proposal rectangle. Additionally the method disclosed includes, responsive to receiving user actions, selecting a frame element proposal rectangle having a possible sectional relationship with the selected frame proposal rectangle; and changing the relationship between the selected frame element proposal rectangle and the selected frame proposal rectangle from a possible sectional relationship to an actual sectional relationship, displaying within the nested tower attachment area the selected frame element proposal automatically scaled to limit, retention, and risk percentage, thereby visually building in the nested tower attachment area a potential frame coverage structure. The method disclosed includes further differentiating handling of proposal rectangles responsive to the proposal rectangles' relationships or responsive to the corresponding coverage proposals' relationships, responsive to receiving user actions, submitting the nested tower attachment area visually displaying or visually representing a frame element proposal rectangle having a sectional relationship with the selected frame proposal rectangle in the selected frame proposal rectangle in the tower attachment area. The disclosed method includes, responsive to receiving user actions submitting the nested tower attachment area, also ceasing to display within the visual workspace the nested tower attachment area. The method disclosed further includes receiving user actions selecting a frame proposal rectangle to locate in the tower attachment area; and locating in the tower attachment area the selected frame proposal rectangle automatically scaled to limit, retention, and risk percentage of the corresponding frame coverage proposal, thereby visually building in the tower attachment area a potential composite coverage structure, including a frame proposal rectangle, for the RTBP from the proposal rectangles.

In some implementations, the disclosed method includes, responsive to receiving user actions, selecting a frame proposal rectangle and moving the selected frame proposal rectangle within the tower attachment area. The method further includes differentiating handling of proposal rectangles responsive to the proposal rectangles' relationships or responsive to the corresponding coverage proposals' relationships by, responsive to receiving user actions selecting a frame proposal rectangle, moving the selected frame proposal rectangle within the tower attachment area, moving a frame element proposal rectangle having an actual sectional relationship with the selected frame proposal rectangle as a single unit. Further, the method includes, responsive to receiving user actions selecting a frame proposal rectangle, moving the selected frame proposal rectangle from the tower attachment area into the palette or the surplus area, or moving the selected frame proposal rectangle from the palette or the surplus area into the tower attachment area. The method also includes differentiating handling of proposal rectangles responsive to the proposal rectangles' relationships or responsive to the corresponding coverage proposals' relationships by, responsive to receiving user actions selecting a frame proposal rectangle and moving the selected frame proposal rectangle from the tower attachment area into the palette or the surplus area, or moving the selected frame proposal rectangle from the palette or the surplus area into the tower attachment area, moving a frame element proposal rectangle having an actual sectional relationship with the selected frame proposal rectangle as a single unit.

In one implementation, the method disclosed further includes accommodating additional variant frame proposal rectangle and frame element proposal rectangle types, including at least: a third variant, request for quote frame rectangle, a frame proposal rectangle created responsive to user actions to request a coverage proposal with user-requested extents of limit, retention, and risk percentage, and a fourth variant, quote proposal rectangle, a frame element proposal rectangle corresponding to a single coverage proposal from a carrier. The method further includes accommodating additional variant frame proposal rectangle and frame element proposal rectangle types, including at least: a fifth variant, subscription frame proposal rectangle, a frame proposal rectangle whose boundaries represent extents of limit, retention, and risk percentage of a subscription coverage proposal, and a sixth variant, subscription element proposal rectangle, a frame element proposal rectangle having a potential constitutive relationship or an actual constitutive relationship with a subscription frame proposal rectangle, whose boundaries represent extents of limit and retention equal to the extents of limit and retention of the subscription coverage proposal corresponding to the potentially or actually constitutively related subscription frame proposal rectangle, and whose risk percentage is less than or equal to the risk percentage of the subscription coverage proposal corresponding to the potentially or actually constitutively related subscription frame proposal rectangle. Further, the method disclosed includes a seventh variant, lead quote subscription element proposal rectangle, a subscription element proposal rectangle whose corresponding coverage proposal, when the lead quote subscription element proposal has an actual constitutive relationship with the subscription frame proposal rectangle, establishes the premium per unit of risk percentage for any other subscription element proposal rectangle having an actual constitutive relationship with the subscription frame proposal rectangle, and an eighth variant, following quote subscription element proposal rectangle, a subscription element proposal rectangle whose corresponding coverage proposal, when the following quote subscription element proposal has an actual constitutive relationship with the subscription frame proposal rectangle, has a premium per unit of risk percentage equal to the lead quote subscription element proposal rectangle having an actual constitutive relationship with the subscription frame proposal rectangle.

The method disclosed, by accommodating additional variant frame proposal rectangle and frame element proposal rectangle types, also includes at least: a ninth variant, layer frame proposal rectangle, a frame proposal rectangle whose boundaries represent extents of limit, retention, and risk percentage of a layer coverage proposal, and a tenth variant, layer element proposal rectangle, a frame element proposal rectangle having a potential constitutive relationship or an actual constitutive relationship with a layer frame proposal rectangle whose limit axis maximum represents a maximum extent of coverage in the limit axis less than or equal to the maximum extent of coverage in the limit axis of the layer coverage proposal corresponding to the potentially or actually constitutively related layer frame proposal rectangle; whose limit axis minimum represents a minimum extent of coverage in the limit axis greater than or equal to the minimum extent of coverage in the limit axis of the layer coverage proposal corresponding to the potentially or actually constitutively related layer frame proposal rectangle; and whose risk percentage is equal to the risk percentage of the layer coverage proposal corresponding to the potentially or actually constitutively related layer frame proposal rectangle.

The method further includes accommodating additional variant frame proposal rectangle and frame element proposal rectangle types, including at least: an eleventh variant, open frame proposal rectangle, a frame proposal rectangle having a potential sectional relationship or an actual sectional relationship with any type of frame proposal rectangle.

Other implementations may include tangible computer-readable memory including computer program instructions that cause a computer to implement any of the methods described above. Yet another implementation may include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of processing and displaying database objects to build a composite coverage structure, including:
   providing a canvas structure that comprises a tower attachment area and a surplus area, wherein the tower attachment area is bounded by an upper tower boundary specified as a tower exhaustion point, which is a sum of a tower limit and a tower retention, a lower tower boundary specified as a tower attachment point, which is equal to the tower retention, and a tower share boundary specified in a range of 5 to 100 percent;
   providing a plurality of coverage frame objects, wherein each of the coverage frame objects:
   represents a request for coverage proposal or a coverage proposal available to be bound as an insurance policy or risk transfer instrument;
   has an extent defined by an upper frame boundary specified as a coverage exhaustion point, a lower frame boundary specified as a coverage attachment point and a frame share boundary; and
   is selectably positioned on the canvas structure in one of a group of positions consisting of within the tower attachment area, straddling the tower share boundary, and in the surplus area outside the tower attachment area;
   receiving data at a processor representing assignment of a first coverage frame object to the tower attachment area and assigning the first coverage frame object to a first position within the tower attachment area;
   receiving data at the processor representing assignment of a second coverage frame object to the surplus area and assigning the second coverage frame object to the surplus area; and
   transmitting graphic user interface (abbreviated GUI) data for display representing at least:
   the canvas structure including the tower attachment area;
   the first coverage frame object automatically positioned and scaled within the tower attachment area based on a relationship of the upper frame boundary and the lower frame boundary to the upper tower boundary and the lower tower boundary; and
   the second coverage frame object positioned outside the tower attachment area.

2. The method of claim 1, further including positioning the first coverage frame object within the tower attachment area relative to the tower share boundary responsive to data at a processor representing a user selection of a share position of the first coverage frame object.

3. The method of claim 1, further including at least one coverage frame object adapted to contain a plurality of other coverage frame objects.

4. The method of claim 3, further including differentiating between a lead quote and following quotes that follow the lead quote, with at least one lead quote coverage frame object and a plurality of following quote coverage frame objects contained within a same coverage frame object serving as a container.

5. The method of claim 1, wherein at least one coverage frame object is a quote and further includes a premium for binding the insurance policy or risk transfer instrument.

6. The method of claim 1, further including:
receiving data at a processor representing user selection of a displayed coverage frame object; and
transmitting for display information for a selected coverage frame object, the information includes proposal type; coverage layer limit, layer retention and risk percentage; market for a corresponding coverage proposal; carrier credit rating; coverage premium; and coverage rate-on-line (C-ROL).

7. The method of claim 1, further including transmitting for display information that aggregates the coverage frame objects assigned to the tower attachment area, the information that aggregates the coverage frame objects includes a count of the coverage frame objects, total premium quoted or bound, aggregate coverage quoted or bound, buyer net retained line (BNRL) and tower rate-on-line (T-ROL).

8. The method of claim 1, further including:
receiving data at a processor representing a user moving the second coverage frame object into the tower attachment area;
updating the second coverage frame object to assign it to the tower attachment area; and
updating and transmitting for display the information that aggregates the coverage frame objects assigned to the tower attachment area.

9. The method of claim 1, further including:
providing a palette structure, outside the tower attachment area and distinct from the canvas structure;
wherein each of the coverage frame objects can further be selectably positioned on the palette structure instead of the canvas structure; and
transmitting GUI data for display at a processor that further includes data representing the palette structure and a third coverage frame object positioned within the palette structure.

10. The method of claim 1, further including:
receiving data at a processor representing assignment of a third coverage frame object to straddle the tower share boundary, including data indicating what share of the third coverage frame object is within the tower attachment area; and
transmitting GUI data for display at the processor that further includes data representing the third coverage frame object:
automatically positioned within the tower attachment area based on relationship of the upper frame boundary and the lower frame boundary to the upper tower boundary and the lower tower boundary; and
positioned partially within the tower attachment area and partially outside the tower attachment area, as assigned.

11. The method of claim 10, further including:
transmitting GUI data for display that suggests subdivision of the third coverage frame object at the tower share boundary;
receiving data at a processor representing user input designating subdivision of the third coverage frame object; and
creating a plurality of new coverage frame objects contained within the third coverage frame object, wherein the new coverage frame objects subdivide the third coverage frame object and assigning one or more of the new coverage frame objects that are within the tower attachment area to the tower attachment area.

12. The method of claim 1, further including:
receiving data at a processor representing user input positioning a fourth coverage frame object in a fourth position, wherein the fourth position is in the tower attachment area or straddling the tower share boundary and the fourth coverage frame object overlaps the position of the first coverage frame object;
generating GUI data for display that suggests subdivision of the first and/or fourth coverage frame object at lines defining the overlap in positions;
receiving data at a processor representing user input designating subdivision of the first or fourth coverage frame object, retention of one or more designated parts of the subdivided coverage frame object in the tower attachment area, and transfer of one or more overlapped and undesignated parts out of the tower attachment area;
creating a plurality of new coverage frame objects contained within the designated coverage frame object, wherein the new coverage frame objects subdivide the designated coverage frame object and assigning one or more of the new coverage frame objects as designated to the tower attachment area; and
transmitting GUI data for display representing the subdivision of the designated coverage frame object.

13. The method of claim 12, further including, in the transmitted GUI data for display at a processor, data representing one or more unused parts of the designated coverage frame object in a ghosted frame that represents a whole coverage proposal.

14. The method of claim 12, further including generating a new request for coverage proposal from at least some of the new coverage frame objects within the subdivided designated coverage frame and transmitting the new request for coverage proposal to at least a party that offered the coverage proposal in the fourth coverage frame object or another party.

15. The method of claim 1, further including:
receiving data at a processor representing a coverage proposal responsive to a request for coverage proposal;
linking a fifth coverage frame object that represents the coverage proposal to a fourth coverage frame object that represents the request for coverage proposal; and
transmitting GUI data for display that visually represents the fifth coverage frame object as coincident in position with and responsive to the fourth coverage frame object.

16. A computer implemented system of processing and displaying database objects to build a composite coverage structure, the computer implemented system including:
a processor, memory coupled to the processor, and program instructions stored in the memory that implement a method comprising:
providing a canvas structure that comprises a tower attachment area and a surplus area, wherein the tower attachment area is bounded by an upper tower boundary specified as a tower exhaustion point, which is a sum of a tower limit and a tower retention, a lower tower boundary specified as a tower attachment point, which is equal to the tower retention, and a tower share boundary specified in a range of 5 to 100 percent;
providing a plurality of coverage frame objects, wherein each of the coverage frame objects:
represents a request for coverage proposal or a coverage proposal available to be bound as an insurance policy or risk transfer instrument;
has an extent defined by an upper frame boundary specified as a coverage exhaustion point, a lower frame boundary specified as a coverage attachment point and a frame share boundary; and is selectably positioned on the canvas structure in one of a group of positions consisting of within the tower attachment area, straddling the tower share boundary, and in the surplus area outside the tower attachment area;

receiving data at a processor representing assignment of a first coverage frame object to the tower attachment area and assigning the first coverage frame object to a first position within the tower attachment area;

receiving data at the processor representing assignment of a second coverage frame object to the surplus area and assigning the second coverage frame object to the surplus area; and transmitting graphic user interface (abbreviated GUI) data for display representing at least:

the canvas structure including the tower attachment area;

the first coverage frame object automatically positioned and scaled within the tower attachment area based on a relationship of the upper frame boundary and the lower frame boundary to the upper tower boundary and the lower tower boundary; and the second coverage frame object positioned outside the tower attachment area.

17. A tangible computer readable storage medium that stores program instructions that implement a method of processing and displaying database objects to build a composite coverage structure, the implementation including:

providing a canvas structure that comprises a tower attachment area and a surplus area, wherein the tower attachment area is bounded by an upper tower boundary specified as a tower exhaustion point, which is a sum of a tower limit and a tower retention, a lower tower boundary specified as a tower attachment point, which is equal to the tower retention, and a tower share boundary specified in a range of 5 to 100 percent;

providing a plurality of coverage frame objects, wherein each of the coverage frame objects:

represents a request for coverage proposal or a coverage proposal available to be bound as an insurance policy or risk transfer instrument;

has an extent defined by an upper frame boundary specified as a coverage exhaustion point, a lower frame boundary specified as a coverage attachment point and a frame share boundary; and is selectably positioned on the canvas structure in one of a group of positions consisting of within the tower attachment area, straddling the tower share boundary, and in the surplus area outside the tower attachment area;

receiving data at a processor representing assignment of a first coverage frame object to the tower attachment area and assigning the first coverage frame object to a first position within the tower attachment area;

receiving data at the processor representing assignment of a second coverage frame object to the surplus area and assigning the second coverage frame object to the surplus area; and transmitting graphic user interface (abbreviated GUI) data for display representing at least:

the canvas structure including the tower attachment area;

the first coverage frame object automatically positioned and scaled within the tower attachment area based on a relationship of the upper frame boundary and the lower frame boundary to the upper tower boundary and the lower tower boundary; and the second coverage frame object positioned outside the tower attachment area.

* * * * *